United States Patent
Todu et al.

(10) Patent No.: US 11,075,597 B2
(45) Date of Patent: Jul. 27, 2021

(54) MOTOR CONTROL DEVICE

(71) Applicant: AISIN SEIKI KABUSHIKI KAISHA, Kariya (JP)

(72) Inventors: Kenji Todu, Kariya (JP); Misato Maeda, Kariya (JP); Naoki Onosaka, Kariya (JP); Keirei Lin, Kariya (JP); Genki Yamashita, Obu (JP)

(73) Assignee: AISIN SEIKI KABUSHIKI KAISHA, Kariya (JP)

( * ) Notice: Subject to any disclaimer, the term of this patent is extended or adjusted under 35 U.S.C. 154(b) by 25 days.

(21) Appl. No.: 16/703,123

(22) Filed: Dec. 4, 2019

(65) Prior Publication Data

US 2020/0177118 A1 Jun. 4, 2020

(30) Foreign Application Priority Data

Dec. 4, 2018 (JP) .............................. JP2018-227184
Apr. 16, 2019 (JP) .............................. JP2019-077584

(51) Int. Cl.
*H02P 6/08* (2016.01)
*H02P 21/18* (2016.01)
*H02P 21/09* (2016.01)

(52) U.S. Cl.
CPC ................ *H02P 21/18* (2016.02); *H02P 6/08* (2013.01); *H02P 21/09* (2016.02)

(58) Field of Classification Search
CPC .... H02P 6/08; H02P 6/18; H02P 21/09; H02P 21/18; H02P 21/22; H02P 21/32
See application file for complete search history.

(56) References Cited

U.S. PATENT DOCUMENTS

| 6,396,229 B1* | 5/2002 | Sakamoto ................. H02P 6/18 |
| | | 318/400.02 |
| 6,501,243 B1 | 12/2002 | Kaneko et al. |
| 6,531,843 B2 | 3/2003 | Iwaji et al. |
| 6,555,988 B2 | 4/2003 | Masaki et al. |
| 6,639,377 B2 | 10/2003 | Iwaji et al. |
| 8,106,622 B2 | 1/2012 | Aoki et al. |

(Continued)

FOREIGN PATENT DOCUMENTS

| JP | 3312472 B2 | 8/2002 |
| JP | 3454212 B2 | 10/2003 |

(Continued)

*Primary Examiner* — Rina I Duda
(74) *Attorney, Agent, or Firm* — Buchanan Ingersoll & Rooney PC

(57) ABSTRACT

A motor control device controls driving of a motor in response to d-axis and q-axis current commands set on the basis of a torque command. The motor control device includes: an electrical angle estimation unit configured to estimate an electrical angle of the motor according to at least one of methods of estimating the electrical angle on the basis that a leakage current in a q axis becomes zero by applying a voltage to a d axis, on the basis that at least one of a phase current difference and a line current difference caused by an induced voltage generated due to rotation of the motor becomes zero, and on the basis of a voltage equation, depending on an angular velocity of the motor, a modulation rate of a pwm signal, and whether a magnetic flux change is included in a nonlinear region.

19 Claims, 8 Drawing Sheets

(56) References Cited

U.S. PATENT DOCUMENTS

| | | | | |
|---|---|---|---|---|
| 8,395,339 B2* | 3/2013 | Kato | ............... | H02P 21/26 |
| | | | | 318/400.33 |
| 9,793,844 B2* | 10/2017 | Yamashita | ............... | H02P 21/05 |
| 10,348,230 B2 | 7/2019 | Hachiya et al. | | |
| 2014/0145660 A1* | 5/2014 | Shimada | ............... | H02P 21/24 |
| | | | | 318/400.33 |
| 2015/0357956 A1* | 12/2015 | Shimada | ............... | H02P 6/181 |
| | | | | 318/400.02 |
| 2017/0113715 A1* | 4/2017 | Yamano | ............... | H02P 6/18 |

FOREIGN PATENT DOCUMENTS

| | | | |
|---|---|---|---|
| JP | 3681318 | B2 | 8/2005 |
| JP | 3840905 | B2 | 11/2006 |
| JP | 4167863 | B2 | 10/2008 |
| JP | 4396762 | B2 | 1/2010 |
| JP | 4632157 | B2 | 2/2011 |
| JP | 5893232 | B1 | 3/2016 |
| JP | 2017070122 | A | 4/2017 |

* cited by examiner

MOTOR CONTROL DEVICE

CROSS REFERENCE TO RELATED APPLICATIONS

This application is based on and claims priority under 35 U.S.C. § 119 to Japanese Patent Applications 2018-227184 and 2019-077584, filed on Dec. 4, 2018 and Apr. 16, 2019, respectively, the entire contents of which are incorporated herein by reference.

TECHNICAL FIELD

This disclosure relates to a motor control device, and particularly to a motor control device including an electrical angle estimation unit that estimates an electrical angle of a motor.

BACKGROUND DISCUSSION

In the related art, there is a motor control device including an electrical angle estimation unit estimating an electrical angle of a motor (for example, refer to Japanese Patent No. 3312472 (Reference 1) and JP 2017-70122A (Reference 2)).

In Reference 1, an alternating voltage is applied to a motor, and a motor current that flows due to the application of the alternating voltage (AC voltage) is detected. The detected motor current is divided into a component parallel to and a component orthogonal to the applied alternating voltage. Here, in a case where the alternating voltage is applied to the motor, a current also flows in a direction orthogonal to a vector of the alternating voltage except when the vector of the alternating voltage is parallel or orthogonal to a rotor magnetic pole axis. The current is detected, and thus a phase difference angle between the vector of the alternating voltage and a magnetic flux axis can be detected. A phase of the vector of the alternating voltage that is applied such that a phase difference angle becomes zero is adjusted, and thus a magnetic pole position (electrical angle) is indirectly estimated.

In Reference 2, an electrical angle of a motor is estimated on the basis of an adaptive observer model and an extended induced voltage observer model. In the adaptive observer model, a state (magnetic flux) and an output (current) of an AC motor are estimated through calculation on the basis of an input (a voltage command for an inverter) for the AC motor, and an electrical angle is estimated on the basis of a deviation between an estimated current and a current detected by a current sensor. In the extended induced voltage observer model, an electrical angle is estimated by using a state quantity such as an extended induced voltage having position information of a rotor on the basis of motor parameters such as a resistance and an inductance that are measurable in advance and physical quantities such as a current and a voltage that are detectable by sensors.

In the estimation of an electrical angle disclosed in Reference 1 and Reference 2, the electrical angle may be successively estimated (at a relatively small angle interval).

Here, in the estimation of an electrical angle disclosed in Reference 1 and Reference 2, the electrical angle may be successively estimated (at a relatively small angle interval), and a problem that there is a case where an error occurs in the estimation of the electrical angle has been found.

Thus, a need exists for a motor control device which is not susceptible to the drawback mentioned above.

SUMMARY

A motor control device according to an aspect of the present invention controls driving of a motor provided with a permanent magnet in response to a d-axis current command and a q-axis current command that are set on the basis of a torque command, and the motor control device includes an electrical angle estimation unit configured to estimate an electrical angle of the motor according to at least one of a first method of estimating the electrical angle of the motor on the basis that a leakage current in a q axis becomes zero by applying a voltage to a d axis and, a second method of estimating the electrical angle of the motor on the basis of at least one of a phase current difference and a line current difference caused by an induced voltage generated due to rotation of the motor becomes zero, and a third method of estimating the electrical angle on the basis of a voltage equation, depending on an angular velocity of the motor, a modulation rate of a pwm signal, and whether a magnetic flux change is included in a nonlinear region in which the magnetic flux change is nonlinear, in which, in a case where the electrical angle of the motor is estimated according to at least one of the first method and the third method, with respect to the electrical angle estimated according to the second method, the electrical angle estimation unit is configured to replace the electrical angle estimated according to at least one of the first method and the third method with the electrical angle estimated according to the second method.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, embodiments disclosed here will be described with reference to the drawings.

First Embodiment

Structure of Motor Control Device

With reference to FIGS. 1 to 13, a description will be made of a configuration of a motor control device 100 according to a first embodiment. In the following description, "ref" indicates a command, and "idn" indicates a time lapse and extension to a nonlinear region.

Configuration of Motor Control Device

Figure 1:
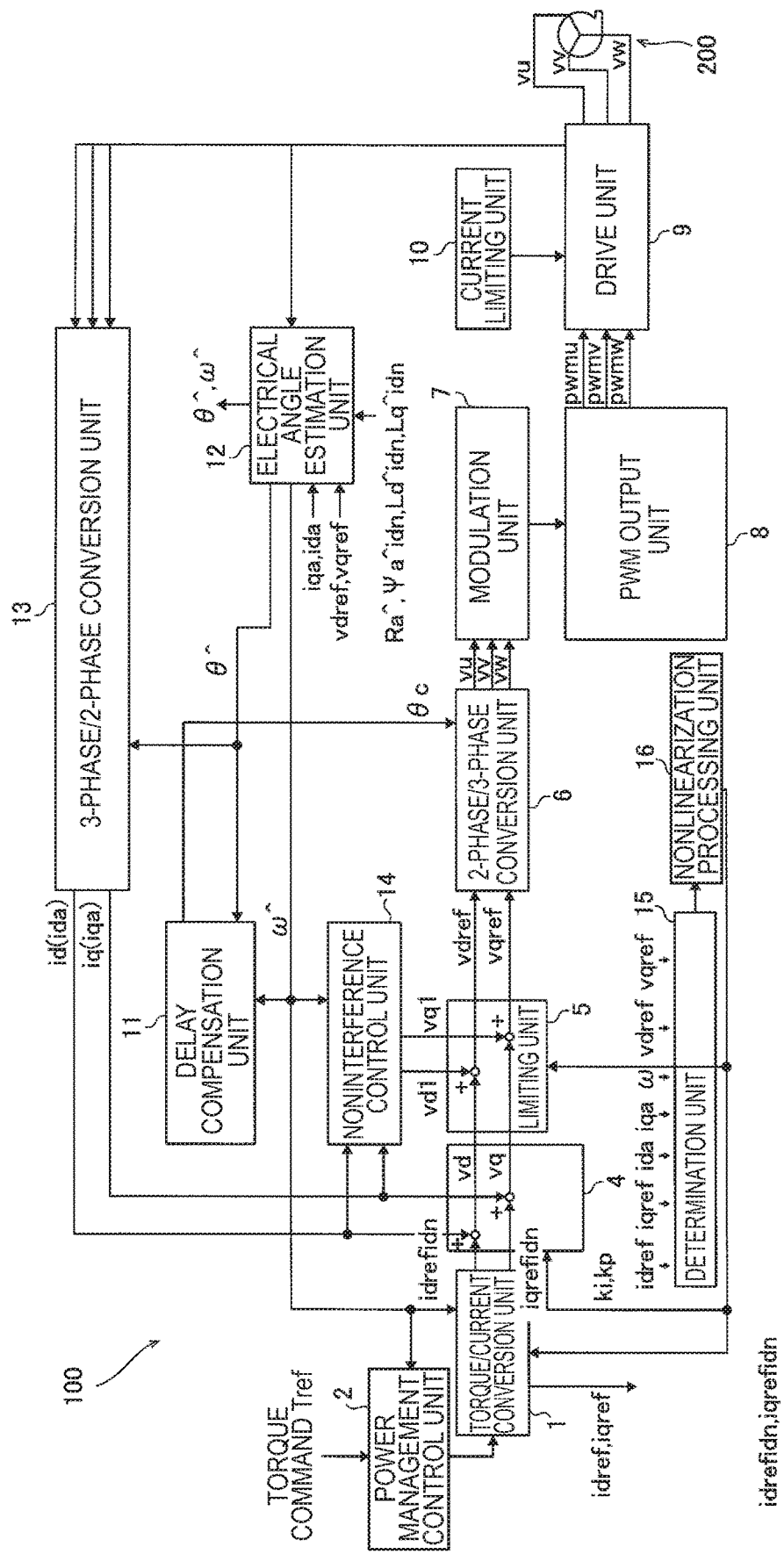
FIG. 1 is a block diagram illustrating a motor control device according to a first embodiment disclosed here.

As illustrated in FIG. 1, the motor control device 100 is configured to control driving of a motor 200 provided with a permanent magnet (not illustrated) in response to a d-axis current command idref and a q-axis current command iqref that are set on the basis of a torque command Tref. Hereinafter, details thereof will be described.

The motor 200 is provided with a plurality of permanent magnets. The motor 200 is an interior permanent magnet (IPM) motor in which permanent magnets are buried in a rotor (not illustrated) or a surface permanent magnet (SPM) motor in which permanent magnets are disposed on a surface of a rotor.

The motor control device 100 includes a torque/current conversion unit 1. The torque command Tref is input to the torque/current conversion unit 1 via a power management control unit 2. An angular velocity $\omega s\hat{}$ of the motor 200 estimated by an electrical angle estimation unit 12 which will be described later is input to the torque/current conversion unit 1. The torque/current conversion unit 1 calculates a d-axis current command idrefidn and a q-axis current command iqrefidn on the basis of the torque command Tref and the angular velocity $\omega s\hat{}$ of the motor 200.

The motor control device 100 includes a current/voltage conversion unit 4. The current/voltage conversion unit 4 converts the d-axis current command idrefidn and the q-axis current command iqrefidn calculated by the torque/current conversion unit 1 into a d-axis voltage command vdref and a q-axis voltage command vqref, respectively.

Specifically, a d-axis current id and a q-axis current iq from a 3-phase/2-phase conversion unit 13 are input to the current/voltage conversion unit 4. The current/voltage conversion unit 4 integrates a difference between the d-axis current command idref and the d-axis current id and a difference between the q-axis current command iqref and the q-axis current iq. A difference integral value of the d-axis current command idref and the d-axis current id and a difference integral value of the q-axis current command iqref and the q-axis current iq are added in a state of being respectively multiplied by gains (ki and kp).

The motor control device 100 includes a limiting unit 5. The limiting unit 5 is configured to limit increases of the d-axis voltage command vdref and the q-axis voltage command vqref output from the current/voltage conversion unit 4. For example, in a case where the d-axis voltage command vdref (q-axis voltage command vqref) is equal to or less than a predetermined threshold value, the d-axis voltage command vdref (q-axis voltage command vqref) is output to have an original value from the limiting unit 5. On the other hand, in a case where the d-axis voltage command vdref (q-axis voltage command vqref) is more than a limiter vdlim (vqlim), the d-axis voltage command vdref (q-axis voltage command vqref) is converted into a value (any constant value) of the limiter vdlim (vqlim) and is output.

The motor control device 100 includes a 2-phase/3-phase conversion unit 6. The 2-phase/3-phase conversion unit 6 is configured to subject the d-axis voltage command vdref (q-axis voltage command vqref) output from the limiting unit 5 to inverse Park transform and inverse Clarke transform, and thus to output voltages vu, vv, and vw corresponding to 3-phase voltage values.

The motor control device 100 includes a modulation unit 7. The modulation unit 7 performs envelope center shift modulation on the voltages vu, vv, and vw that are input from the 2-phase/3-phase conversion unit 6. Specifically, the modulation unit 7 compares values of the voltages vu, vv, and vw with each other, and uses ½ of an intermediate value of the voltages vu, vv, and vw as a correction value. The modulation unit 7 is configured to subtract the correction value from the voltages vu, vv, and vw and to output subtracted values.

The motor control device 100 includes a PWM output unit 8. The PWM output unit 8 outputs PWM signals pwmu, pwmv, and pwmw for driving a plurality of bridge-connected switching elements (not illustrated) included in a drive unit 9 on the basis of signals (signals obtained by subtracting the correction value from the voltages vu, vv, and vw) output from the modulation unit 7.

The motor control device 100 includes the drive unit 9. The drive unit 9 applies the 3-phase voltages vu, vv, and vw to the motor 200 by turning on and off a plurality of switching elements 9a (refer to FIG. 2) on the basis of the PWM signals pwmu, pwmv, and pwmw. Consequently, the motor 200 is rotated at a speed corresponding to cycles of the applied voltages vu, vv, and vw.

The motor control device 100 includes a current limiting unit 10. The current limiting unit 10 is configured to limit a current used to control (vector control) the motor 200. In other words, the current limiting unit 10 is configured to limit a current such that a current larger than current limitations (Iam and Iame) does not flow in vector control for the motor 200.

The motor control device 100 includes a delay compensation unit 11. The delay compensation unit 11 is configured to compensate for a rotation delay of the motor 200. Generally, rotation of the motor 200 is delayed due to a plurality of factors such as delays of a calculation process of software or a response of the motor 200. The delay compensation unit 11 inputs a delay angle ($\theta c$) to the 2-phase/3-phase conversion unit 6 on the basis of a delay time obtained by taking into consideration the plurality of factors and the angular velocity $\omega s\hat{}$ estimated by the electrical angle estimation unit 12. A detailed configuration of the electrical angle estimation unit 12 will be described later.

The delay compensation unit 11 is configured not to perform delay compensation on a 3-phase/2-phase conversion unit 13 which will be described later, and to perform delay compensation on the 2-phase/3-phase conversion unit 6. In other words, the delay compensation is performed on only the 2-phase/3-phase conversion unit 6, and is not performed on the 3-phase/2-phase conversion unit 13 to which a current including the influence of weak magnetic flux control is input.

The motor control device 100 includes the 3-phase/2-phase conversion unit 13. The 3-phase/2-phase conversion unit 13 subjects excitation currents Iu, Iv, and Iw with the respective phases of the motor 200 to Clarke transform and Park transform, and thus calculates the q-axis current iq and the d-axis current id.

Figure 2:
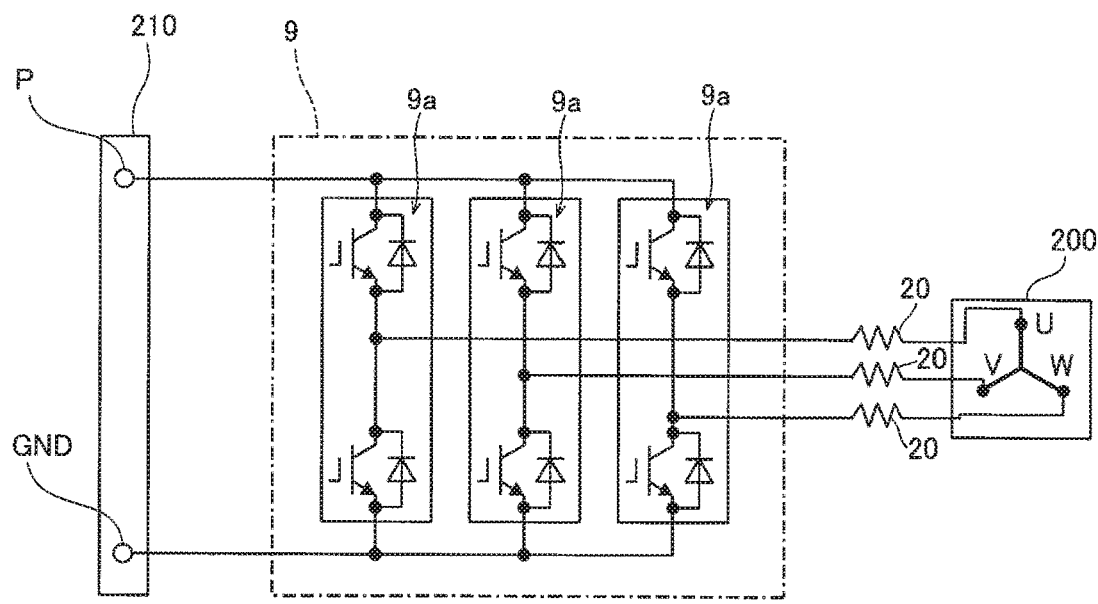
FIG. 2 is a diagram for describing current detection according to a three-shunt method.

As illustrated in FIG. 2, the excitation currents Iu, Iv, and Iw with the respective phases of the motor 200 are detected separately for each phase. In other words, the excitation currents Iu, Iv, and Iw with the respective phases are detected according to a three-shunt method. Specifically, a shunt resistor 20 is provided for each phase on a downstream side of an H bridge circuit including the plurality of switching elements 9a. The excitation currents Iu, Iv, and Iw are detected by the three shunt resistors 20.

The motor control device 100 includes a noninterference control unit 14. The noninterference control unit 14 performs predetermined calculation (calculation regarding interference between iq and id) on the angular velocity ωs^ that is input from the electrical angle estimation unit 12 and the q-axis current iq and the d-axis current id that are output from the 3-phase/2-phase conversion unit 13, and outputs correction values vd1 and vq1 to the limiting unit 5.

The motor control device 100 includes a determination unit 15 that determines (identifies) a d-axis inductance Ld, a q-axis inductance Lq, an armature resistance Ra, an armature interlinkage flux vector φa (torque constant Kt) that are parameters for controlling driving of the motor 200.

The motor control device 100 includes a nonlinearization processing unit 16 that extends the armature interlinkage flux vector φa, the d-axis inductance Ld, and the q-axis inductance Lq determined by the determination unit 15 to a nonlinear region in which a magnetic flux change is nonlinear. The torque/current conversion unit 1 is configured to calculate the d-axis current command idrefidn and the q-axis current command iqrefidn on the basis of the armature interlinkage flux vector φa, the d-axis inductance Ld, and the q-axis inductance Lq extended to the nonlinear region by the nonlinearization processing unit 16. Details of extension to the nonlinear region will be described later.

Figure 3:
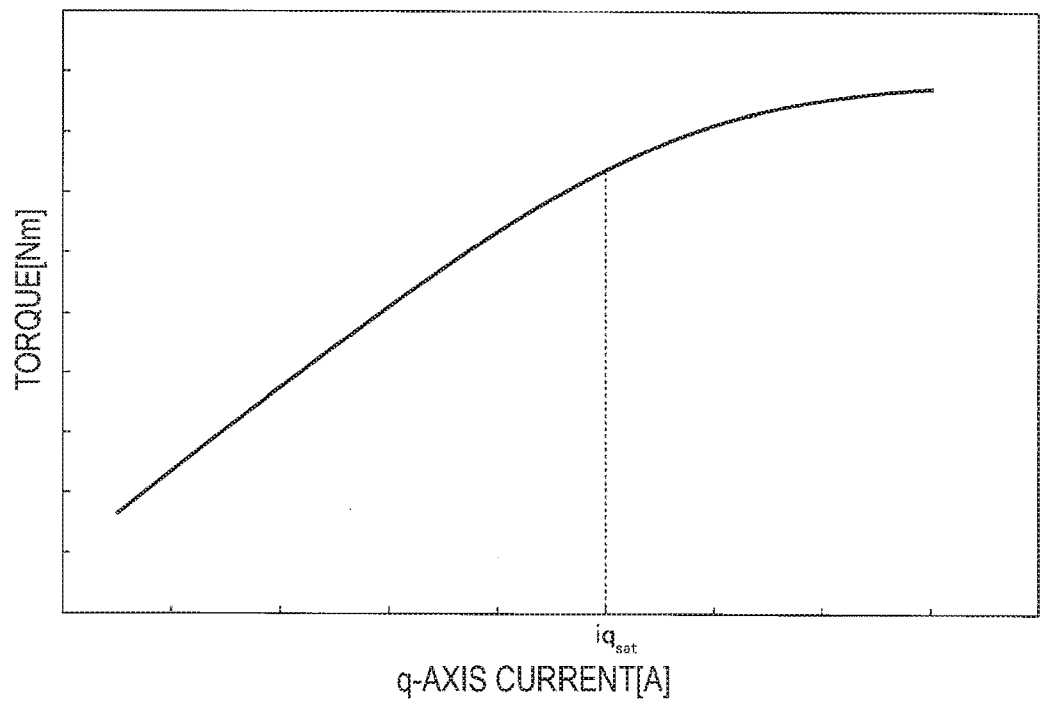
FIG. 3 is a diagram illustrating a relationship between a q-axis current and torque.

With reference to FIG. 3, a linear region and the nonlinear region will be described. As illustrated in FIG. 3, torque (longitudinal axis) increases as a q-axis current (transverse axis) increases. Here, in a case where the q-axis current is smaller than $iq_{sat}$, the torque increases substantially linearly (substantially straight line shape) as the q-axis current increases. On the other hand, in a case where the q-axis current is equal to or larger than $iq_{sat}$, the torque increases nonlinearly as the q-axis current increases. Specifically, an increase amount of the torque is gradually reduced as the q-axis current increases. In other words, as the q-axis current increases, the magnetic flux change increases linearly and then increases nonlinearly. In the present specification, the region where the q-axis current is smaller than $iq_{sat}$ will be referred to as a linear region, and the region where the q-axis current is equal to or larger than $iq_{sat}$ will be referred to as a nonlinear region. FIG. 3 illustrates a relationship between the q-axis current and the torque, and a relationship between a d-axis current and torque is the same as in FIG. 3.

Detailed Configuration of Electrical Angle Estimation Unit

Next, a description will be made of a detailed configuration of the electrical angle estimation unit 12.

Here, in the first embodiment, as shown in the following Table 1, the electrical angle estimation unit 12 is configured to estimate an electrical angle of the motor 200 according to at least one of a first method, a second method, and a third method on the basis of an angular velocity ω^ of the motor 200, a modulation rate of a pwm signal, and whether a magnetic flux change is included in the linear region or the nonlinear region. The first method is a method of estimating an electrical angle (θvd^) of the motor 200 on the basis that a leakage current in the q axis becomes zero by applying a voltage to the d axis. The second method is a method of estimating an electrical angle (θ0^, θ01^, θ0e^, and θ01e^) of the motor 200 on the basis that at least one of a phase current difference and a line current difference caused by an induced voltage generated due to rotation of the motor 200 is zero. The third method is a method of estimating an electrical angle (θo^) on the basis of a voltage equation. An electrical angle (Δθp^) corresponding to an initial position is estimated in a region in which an angular velocity of the motor 200 is substantially 0. Hereinafter, details thereof will be described.

TABLE 1

| Angular velocity (ω^) | Around zero | Low velocity | Intermediate velocity | High velocity | Overmodulation Nonlinear region | Step-out (low velocity) | Step-out (high velocity) |
|---|---|---|---|---|---|---|---|
| θ0^ | | ○ | ○ | (○) | (○) | | ○ |
| θ0e^ | | ○ | ○ | ○ | ○ | | (○) |
| θ01^ | | ○ | ○ | ○ | | | |
| θ01e^ | | ○ | | | | | |
| Δθp^ | ○ | | | | | ○ | |
| θvd^ | ○ | ○ | ○ | | | ○ | |
| Θo^ | | | ○ | ○ | | | |

Initial Position Estimation

In initial position estimation, voltages are applied to the permanent magnets, and ripples of currents when the voltages are applied are integrated. An initial position (Δθp^) of an electrical angle is estimated on the basis of a polarity of the integral value (Σθpd^ and Σθpq^ in the following table 2). Initial positions of a salient-pole machine and a non-salient-pole machine may be determined on the basis of Σθpd^ and Σθpq^. The initial position estimation is performed only once when an angular velocity of the motor 200 is substantially 0. In addition, Δθp^ is set as an initial value in the first method (θvd^) which will be described later.

TABLE 2

| Polarity of Σθpd^ | Polarity of Σθpd^ | Δθp^ |
|---|---|---|
| + | + | 0 to −90 deg |
| + | − | 0 to 90 deg |
| − | + | −90 to −180 deg |
| − | − | 90 to 180 deg |

First Method

In the first method, a voltage is applied to the d axis, and the voltage applied to the d axis is adjusted such that a leakage current that leaks in the q axis is 0. Consequently, the electrical angle (θvd^) can be indirectly estimated.

Figure 4:
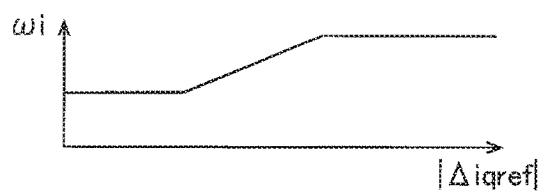
FIG. 4 is a diagram illustrating a relationship between a change rate of the q-axis current and a load.

In the first method, the electrical angle estimation unit 12 is configured to reduce a sampling interval for estimating an electrical angle according to the first method in a case where a change rate (Δiqref) of the q-axis current is high more than in a case where the change rate of the q-axis current is low. Specifically, as illustrated in FIG. 4, the change rate (Δiqref) of the q-axis current increases at a low speed and a high load (when ωi is large). In this case, a sampling interval (Δt) is reduced, and a width of the pwm signal is also reduced, according to the magnitude of the change rate (Δiqref) of the q-axis current. Consequently, it is possible to reduce an error in estimation of the electrical angle (θvd^). It is possible to reduce a switching loss.

In the first method, the electrical angle estimation unit 12 is configured to correct the electrical angle (θvd^) that is estimated when magnetic flux is saturated, on the basis of the following Equation 7.

$$\theta vd^\wedge = \theta vd^\wedge \times SV0/SV1$$

$$SV0 = \omega^\wedge \times Kt^\wedge idn0 + (Ld^\wedge idn0 - Lq^\wedge idn0) \times (\omega^\wedge \times idrefn - piqrefn)$$

$$SV1 = \omega^\wedge \times Kt^\wedge idn + (Ld^\wedge idn - Lq^\wedge idn) \times (\omega^\wedge \times idrefn - piqrefn) \quad \text{(Equation 7)}$$

Here, ω indicates an angular velocity, Kt indicates a counter-electromotive force constant, Ld indicates d-axis inductance, Lq indicates q-axis inductance, idrefn indicates a d-axis current command value, and iqrefn indicates a q-axis current command value. The subscript ind indicates the present value, and the subscript ind0 indicates a value in a region in which magnetic flux of the motor is not saturated. In addition, p indicates time differentiation.

Here, in a case where a load of the motor 200 increases, and thus a current amount increases, a phenomenon in which magnetic flux is saturated occurs. Consequently, the saliency of local inductance decreases nonlinearly, and thus the sensitivity of magnetic pole position detection using the saliency in a high load region deteriorates. Therefore, as described above, the electrical angle (θvd^) estimated when magnetic flux is saturated is corrected.

Here, in the first embodiment, in the first method, in a case where a difference between the q-axis inductance Lq and the d-axis inductance Ld is less than a predetermined threshold value, the difference between the q-axis inductance Lq and the d-axis inductance Ld is increased according to at least one of an increase of the q-axis inductance Lq and a reduction of the d-axis inductance Ld. Here, the first method is used in a case where an angular velocity of the motor 200 is low (in a case of a low velocity), but, in a case where a salient-pole difference (difference between Lq and Ld) is relatively small, it is difficult to estimate the electrical angle θvd^. Therefore, as described above, the difference Lq and Ld is increased.

There are many control restrictions such as a torque reduction or interferences, and thus the d axis is adjusted. The weak magnetic flux reduces the torque of the motor 200 and also causes demagnetization. In the motor 200 with relatively small saliency, respective magnetic saturation points of the d axis and the q axis are close to each other. The motor 200 is brought into a strong magnetic flux state, and thus Ld is reduced in a magnetic saturation region. Consequently, a salient-pole difference (difference between Lq and Ld) is increased. As a result, it is possible to easily estimate the electrical angle θvd^. The motor 200 is brought into a strong magnetic flux state, and thus the torque of the motor 200 increases in a low speed region. In other words, there is an advantage in that the torque for activating the motor 200 increases. In intermediate speed and high speed regions, the process (reducing Ld) is not performed, and the process does not influence performance of the motor 200 in the intermediate speed and high speed regions.

The inductance L of a coil is represented by the following Equation 8.

$$L = \mu \times N^2 \times S/l \quad \text{(Equation 8)}$$

Here, μ indicates permeability, N indicates the number of turns of the coil, S indicates a sectional area, and l indicates a coil length. Magnetic saturation occurs in the strong magnetic flux state (a state in which a current increases in a magnetic flux direction of a magnet). Consequently, the permeability μ is reduced. As a result, L is reduced. Assuming that Ld is reduced, and Lq does not change, a salient-pole difference (actually, an inverse salient-pole difference) increases. The motor 200 has an inverse salient-pole difference in which Lq is larger than Ld (Lq>Ld).

Figure 5:
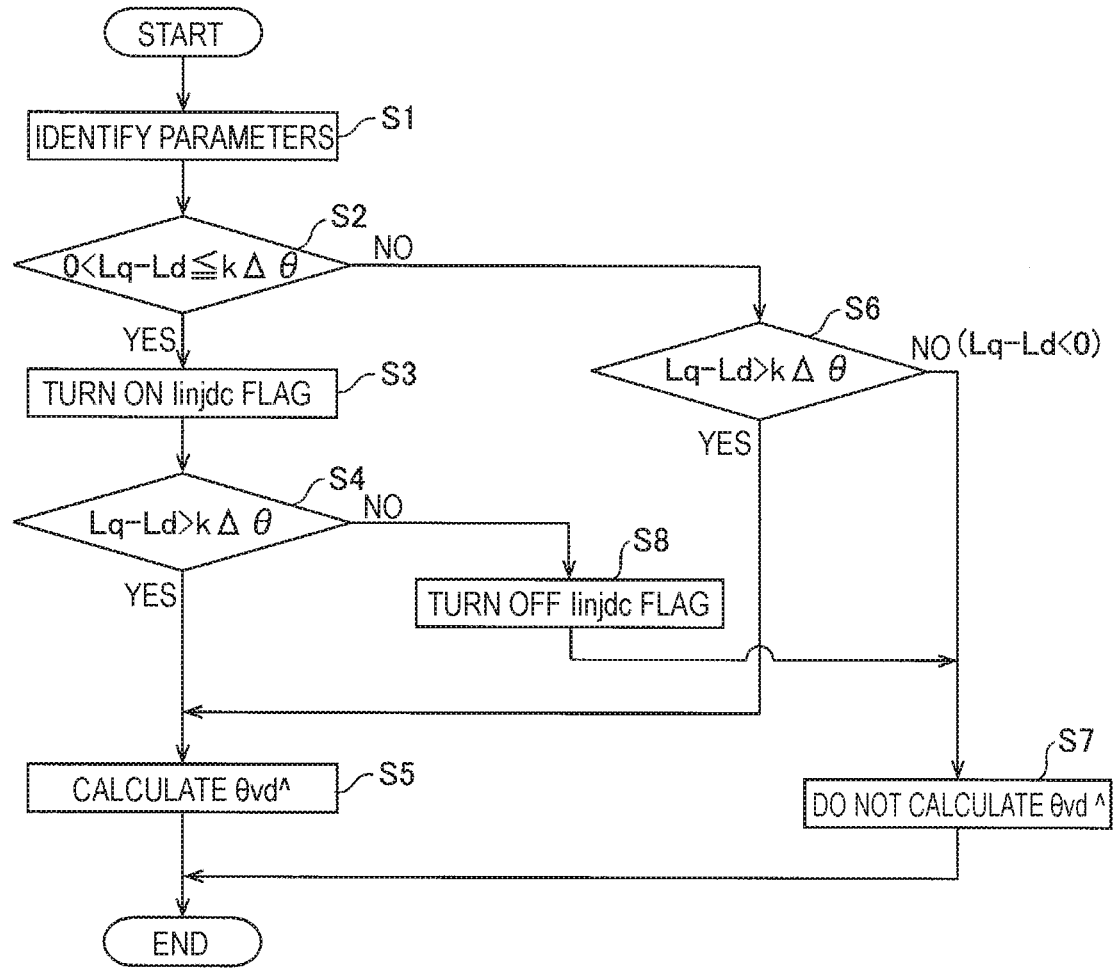
FIG. 5 is a flowchart for describing a process of estimating an electrical angle according to a first method.

Specifically, as illustrated in FIG. 5, the following process is performed. First, in step S1, the determination unit 15 determines (identifies parameters) Lq and Ld.

Figure 6:
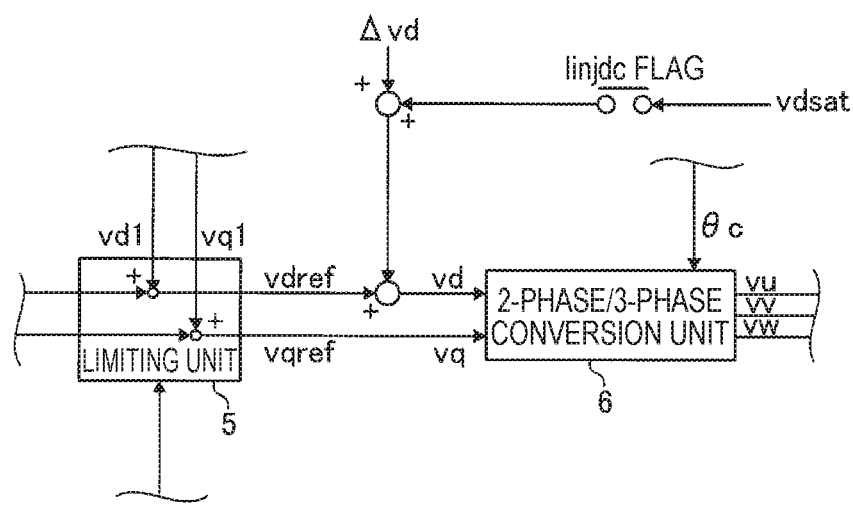
FIG. 6 is a block diagram (partially enlarged view) illustrating the motor control device according to the first embodiment disclosed here.
Figure 7:
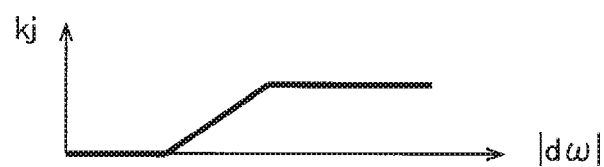
FIG. 7 is a diagram illustrating a map of $d\omega$.

Next, in step S2, it is determined whether or not a difference between Lq and Ld is more than 0 and is equal to or less than a predetermined threshold value (kΔθ). In a case of yes in step S2, in step S3, an linjdc flag is turned on. Consequently, as illustrated in FIG. 6, a DC saturation voltage vdsat is applied in a direction of a strong magnetic flux with respect to the voltage ΔVd (in the first method, a voltage applied to the d axis) such that the motor 200 is brought into a strong magnetic flux state. As a result, a saturation current (linjdc) in the d axis flows.

Next, in step S4, it is determined whether or not the difference between Lq and Ld is more than the predetermined threshold value (kΔθ). In a case of yes in step S4, the flow proceeds to step S5, and the electrical angle θvd^ is estimated.

In a case of no in step S2, the flow proceeds to step S6. In step S6, it is determined whether or not the difference between Lq and Ld is more than the predetermined threshold value (kΔθ). In a case of yes in step S6, the flow proceeds to step S5, and the electrical angle θvd^ is estimated. In a case of no in step S6 (that is, in a case where the difference between Lq and Ld is less than 0), the flow proceeds to step S7. In other words, the electrical angle θvd^ is not estimated (the electrical angle θvd^ cannot be estimated).

In a case of no in step S4, the flow proceeds to step S8, and the linjdc flag is turned off. Thereafter, the flow proceeds to step S7.

Second Method

The second method includes a method (θ0^) based on a phase current difference, a method (θ01^) based on a line current difference, a method (θ0e^) based on a current value in a stationary coordinate system, and a method (θ01e^) based on a current difference when two phases are short-circuited to each other.

In the method based on a phase current difference, the electrical angle θ0^ is estimated on the basis of the following Equation 9.

$$E \times \sin \theta + Ldi^*/dt + Ri^* = 0 \quad \text{(Equation 9)}$$

Here, E indicates a phase induced voltage, L indicates reluctance, i indicates a current, Ri indicates resistance, and * indicates the d axis or the q axis. Since Ri=0 around a zero-cross (a phase current difference is 0), the following Equation 10 may be obtained.

$$E \times \sin\theta \approx -L di^*/dt \quad \text{(Equation 10)}$$

According to the above equation, the phase induced voltage E may be represented by a temporal change of a phase current in a zero vector period. Consequently, it is possible to estimate the electrical angle $\theta 0\hat{}$.

In the method based on a line current difference, the electrical angle $\theta 01\hat{}$ is estimated on the basis of the following Equation 11.

$$Ev \times \sin(\theta - 2\pi/3) - Ew\sin(\theta + 2\pi/3) + L(div/dt - diw/dt) + R(iv-iw) = 0 \quad \text{(Equation 11)}$$

Here, Ev and Ew indicates line induced voltages, L indicates reluctance, iv and iw indicate currents, and R indicates resistance. Since R=0 around a zero-cross (a line current difference is 0), the following Equation 12 may be obtained.

$$Evw \times \sin\theta \approx -L divw/dt \quad \text{(Equation 12)}$$

According to the above equation, the line induced voltage Evw may be represented by a temporal change of a line current in a zero vector period. Consequently, it is possible to estimate the electrical angle $\theta 01\hat{}$.

In the method based on current value in the stationary coordinate system, the electrical angle ($\theta 0e\hat{}$) is estimated on the basis of the following Equation 13.

$$\theta 0e\hat{} \approx \tan^{-1}(pi\beta/pi\alpha) - \pi/2 \quad \text{(Equation 13)}$$

Here, $i\alpha$ indicates a current of the $\alpha$ axis in the stationary coordinate system, and $i\beta$ indicates a current of the $\beta$ axis in the stationary coordinate system. In addition, p indicates time differentiation. In other words, $\theta 0e\hat{}$ is approximately obtained on the basis of a ratio between temporal change rates of a $\beta$-axis current and an $\alpha$-axis current in the stationary coordinate system. The electrical angle $\theta 0e\hat{}$ is a backup when the electrical angle $\theta 0\hat{}$ cannot be detected. Consequently, it is possible to improve stability of detection of a zero-cross. Either the detection of the electrical angle $\theta 0e\hat{}$ or the detection of the electrical angle $\theta 0\hat{}$ may be performed.

Here, in the first embodiment, in the method based on a current value in the stationary coordinate system, an electrical angle of the motor 200 is configured to be estimated on the basis of current values in two phases in which absolute values of current values or absolute values of change amounts of currents are greater among the three phases. Specifically, for example, in a case where absolute values of current values in the U phase and the V phase or absolute values of change amounts of currents thereof are greater (than that in the W phase), $pi\alpha$ and $pi\beta$ are obtained on the basis of the following Equation 14.

$$pi\beta = (1/\sqrt{2}) \times (piu + 2 \times piv)$$

$$pi\alpha = \sqrt{(3/2)} \times piu \quad \text{(Equation 14)}$$

In a case where absolute values of current values in the V phase and the W phase or absolute values of change amounts of currents thereof are greater (than that in the U phase), $pi\alpha$ and $pi\beta$ are obtained on the basis of the following Equation 15.

$$pi\beta = (1/\sqrt{2}) \times (piv - piw)$$

$$pi\alpha = \sqrt{(3/2)} \times (-piv - piw) \quad \text{(Equation 15)}$$

In a case where absolute values of current values in the W phase and the U phase or absolute values of change amounts of currents thereof are greater (than that in the V phase), $pi\alpha$ and $pi\beta$ are obtained on the basis of the following Equation 16.

$$pi\beta = (1/\sqrt{2}) \times (-piu - 2 \times piw)$$

$$pi\alpha = \sqrt{(3/2)} \times piu \quad \text{(Equation 16)}$$

The electrical angle estimation unit 12 is configured to reduce noise on the basis of a d-axis current value and a q-axis current value in the method based on a current value in the stationary coordinate system. Specifically, noise is reduced on the basis of the following Equation 17.

$$\theta 0e = \tan^{-1}(pi\beta/pi\alpha) - \pi/2 - \tan^{-1}(piq/pid) \quad \text{(Equation 17)}$$

Here, iq and id respectively indicate a q-axis current and a d-axis current.

In the method based on a current difference when two phases are short-circuited to each other, the electrical angle ($\theta 01e\hat{}$) is estimated on the basis of the following Equation 18.

if $iv=iw$ $\cos\theta 01e\hat{}/\sin\theta 01e\hat{} = (-(\omega \times (Ld-Lq) \times (3 \times iu/2)))/(-Ld \times p(3 \times iu/2) - (-R \times (3 \times iu/2)))$ if $iu=iv$ $\cos\theta 01e\hat{}/\sin\theta 01e\hat{} = (Ld \times p(3 \times \sqrt{3} \times iu/2) - (-R \times (3 \times \sqrt{3} \times iu/2) + \omega \times (Ld-Lq) \times \times iu/2)))/(-Ld \times p(3 \times iu/2) - (-\omega \times (Ld-Lq) \times (3 \times \sqrt{3} \times iu/2)\hat{} \times (3 \times iu/2)))$ if $iw=iu$ $\cos\theta 01e\hat{}/\sin\theta 01e\hat{}$
$= (Ld \times p(-3 \times \sqrt{3} \times iu/2) - (-R \times (-3 \times \sqrt{3} \times iu/2) + \omega \times (Ld-Lq) \times iu/2)))/(-Ld \times p(3 \times iu/2) - (-\omega \times (Ld-Lq) \times (-3 \times \sqrt{3} \times iu/2)\hat{} \times (3 \times iu/2)))$ (Equation 18)

Here, iu, iv, and iw respectively indicate a u-phase current, a v-phase current, and a w-phase current. In addition, R indicates resistance. The electrical angle $\theta 01e\hat{}$ is a backup when the electrical angle $\theta 01\hat{}$ cannot be detected. Consequently, it is possible to improve stability of detection of a zero-cross. Either the detection of the electrical angle $\theta 01e\hat{}$ or the detection of the electrical angle $\theta 01\hat{}$ may be performed.

The above Equation 18 may be represented by the following Equation 19 according to a boundary condition when two phases are short-circuited to each other.

if $iv=iw$ $\cos\theta 01e\hat{}/\sin\theta 01e\hat{} = (-(\omega \times (Ld-Lq) \times (iu)))/(-Ld \times p(iu) - (-R \times (iu)))$ if $iu=iv$ $\cos\theta 01e\hat{}/\sin\theta 01e\hat{} = (Ld \times p)(\sqrt{3} \times iu) - (-R \times (\sqrt{3} \times iu) + \omega \times (Ld-Lq) \times (iu)))/(-Ld \times xp(iu) - (-\omega \times (Ld-Lq) \times (\sqrt{3} \times iu) - R \times (iu)))$ if $iw=iu$ $\cos\theta 01e\hat{}/\sin\theta 01e\hat{} = (Ld \times p(\sqrt{3} \times iu) - (-R \times (-\sqrt{3} \times iu) + \omega \times (Ld-Lq) \times (iu)))/(-Ld \times xp)(iu) - (-\omega \times (Ld-Lq) \times (-\sqrt{3} \times iu) - R \times (iu)))$ (Equation 19)

In a case where a current change rate is low (that is, in a case where p(iu) is about 0), an electrical angle can be estimated by using only ω (estimated value) and equipment constants as shown in the following Equation 20.

if $iv=iw$ $$\cos\theta 01e\hat{}/\sin\theta 01e\hat{} = (-(\omega\times(Ld-Lq)))/(-(-R))$$

if $iu=iv$ $$\cos\theta 01e\hat{}/\sin\theta 01e\hat{} = (-(-R\times(\sqrt{3})+\omega\times(Ld-Lq)))/(-(-\omega\times(Ld-Lq)\times(\sqrt{3})-R))$$

if $iw=iu$ $$\cos\theta 01e\hat{}/\sin\theta 01e\hat{} = (-(-R\times(-\sqrt{3})+\omega\times(Ld-Lq)))/(-(-\omega\times(Ld-Lq)\times(-\sqrt{3})-R))\quad\text{(Equation 20)}$$

In the first embodiment, in the second method, the electrical angle estimation unit 12 is configured to estimate an electrical angle at which a phase current difference is zero and an electrical angle at which a line current difference is zero on the basis of the following Equations 21 and 22 when the phase current difference is not zero and when the line current difference is not zero.

$$\theta 0c\hat{} = \theta 0t\hat{} - \Delta i^*\times\omega\hat{}/\Delta\Delta 1^* \quad\text{(Equation 21)}$$

$$\theta 10c\hat{} = \theta 01t\hat{} - \Delta i^*\times\omega\hat{}/\Delta\Delta 1^* \quad\text{(Equation 22)}$$

Here, $\theta 0t\hat{}$ and $\theta 01t\hat{}$ respectively indicate target values (an electrical angle of every 60 degrees from 0 degrees, and an electrical angle of every 60 degrees from 30 degrees), $\Delta i^*$ indicates a current difference, and $\Delta\Delta 1^*$ indicates a change rate of $\Delta i^*$. In addition, $^*$ indicates the d axis or the q axis.

Third Method

In the third method, the electrical angle ($\theta o\hat{}$) is estimated on the basis of the following Equation 23. The third method is referred to as an adaptive observer model.

$$\theta 0\hat{} = \tan^{-1}(\lambda\beta/\lambda\alpha) \quad\text{(Equation 23)}$$

Here, λ indicates a field magnetic flux linkage of an armature coil, and the subscripts α and β indicate the stationary coordinate system (the α axis and the β axis).

Here, in the first embodiment, as shown in the above Table 1, the electrical angle estimation unit 12 estimates an electrical angle according to the first method ($\theta vd\hat{}$) and the second method ($\theta 0\hat{}$, $\theta 01\hat{}$, $\theta 0e\hat{}$, and $\theta 01e\hat{}$) in a case where an angular velocity of the motor 200 is low (low velocity). In a very low region of the low speed, $\theta 0e\hat{}$ is not estimated. In a case where an angular velocity of the motor 200 is high (an intermediate velocity or a high velocity), an electrical angle is configured to be estimated according to the second method ($\theta 0\hat{}$, $\theta 01\hat{}$, and $\theta 0e\hat{}$) and the third method ($\theta o\hat{}$). In a case where an angular velocity of the motor 200 is intermediate, switching (combined calculation) between the first method ($\theta vd\hat{}$) and the third method ($\theta o\hat{}$) is performed. In a case of overmodulation in which a modulation rate of a pwm signal is 1 or greater, and in a nonlinear region in which a magnetic flux change is nonlinear, the electrical angle estimation unit 12 is configured to estimate an electrical angle according to the second method ($\theta 0\hat{}$ and $\theta 0e\hat{}$).

Specifically, estimation of the electrical angle $\theta 0\hat{}$ is performed every 60 degrees from 0 degrees. Specifically, in a case where the motor 200 is rotated clockwise, the electrical angle $\theta 0\hat{}$ is estimated at 0 degrees, 60 degrees, 120 degrees, 180 degrees, 240 degrees, and 300 degrees. In a case where the motor 200 is rotated counterclockwise, the electrical angle $\theta 0\hat{}$ is estimated at 0 degrees, -60 degrees, -120 degrees, -180 degrees, -240 degrees, and -300 degrees.

Estimation of the electrical angle $\theta 01\hat{}$ is performed every 60 degrees from 30 degrees. Specifically, in a case where the motor 200 is rotated clockwise, the electrical angle $\theta 01\hat{}$ is estimated at 30 degrees, 90 degrees, 150 degrees, 210 degrees, 270 degrees, and 330 degrees. In a case where the motor 200 is rotated counterclockwise, the electrical angle $\theta 01\hat{}$ is estimated at -30 degrees, -90 degrees, -150 degrees, -210 degrees, -270 degrees, and -330 degrees.

In the first embodiment, in the second method in a nonlinear region in which a magnetic flux change is nonlinear, the electrical angle estimation unit 12 is configured to estimate a plurality of predetermined electrical angles (only $\theta 0e\hat{}$ or both of $\theta 0\hat{}$ and $\theta 0e\hat{}$) and also to estimate an electrical angle between the predetermined electrical angles through interpolation calculation. An electrical angle $\theta 0\hat{}t$ between predetermined electrical angles (electrical angles every 60 degrees) is estimated through interpolation calculation on the basis of the following Equation 24.

$$\theta 0\hat{}t = (\theta 0^{*}\hat{}t1 + (\theta T\hat{}t))$$

$$\theta T\hat{}t = (\omega 0\hat{}t1 + kj\times d\omega 0\hat{}t1\times(t-t1))\times(t-t1) \quad\text{(Equation 24)}$$

Figure 8:
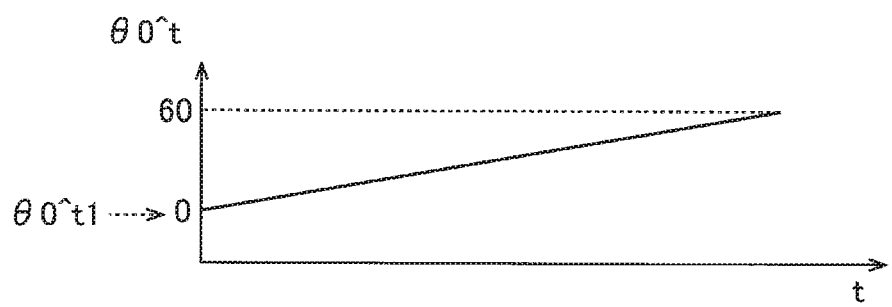
FIG. 8 is a diagram for describing interpolation calculation.

Here, $\theta 0^{*}\hat{}t1$ indicates a certain electrical angle (for example, 0 degrees), t1 indicates a time of entering a certain zone (for example, between 0 degrees to 60 degrees), dω indicates acceleration of an electrical angle, $\omega 0\hat{}$ indicates an estimated value of an angular velocity of the motor 200, and kj indicates a map (refer to FIG. 7) of dω. The electrical angle $\theta 0\hat{}t$ is estimated through interpolation calculation as illustrated in FIG. 8 on the basis of the above equation.

In a case of overmodulation or in a nonlinear region, in a case where a voltage command in each phase is relatively large, and there is no timing at which a zero-cross is detectable (in a case where a zero-cross of a current change rate cannot be detected), a zero vector (active zero vector) is forced to be applied. Specifically, the active zero vector is applied around the electrical angle $\theta 0\hat{}$ of every 60 degrees from 0 degrees. Consequently, the electrical angle $\theta 0e\hat{}$ is estimated.

In a case where the responsiveness of a servomotor is required, it is necessary to perform estimation of an electrical angle from a relatively low velocity (the intermediate velocity in Table 1) to a region in which an induced voltage is generated, the electrical angle $\theta o\hat{}$ is estimated in addition to the electrical angles ($\theta 0\hat{}$, $\theta 01\hat{}$, $\theta 0e\hat{}$, and $\theta 01e\hat{}$) based on a zero-cross. On the other hand, in a case where the responsiveness of a servomotor is not required, only the electrical angles ($\theta 0\hat{}$, $\theta 01\hat{}$, $\theta 0e\hat{}$, and $\theta 01e\hat{}$) based on a zero-cross are estimated. Consequently, it is possible to reduce a load on the motor control device 100.

Here, in the first embodiment, in a case where an electrical angle of the motor is estimated according to at least one of the first method and the third method, with respect to an electrical angle estimated according to the second method, the electrical angle estimation unit 12 is configured to replace (subjected to an override) the electrical angle estimated according to at least one of the first method and the third method with the electrical angle estimated according to the second method. Specifically, as shown in Table 1, in a region in which an angular velocity is low, when the electrical angle $\theta vd\hat{}$ is estimated according to the first method, in a predetermined electrical angle (an electrical angle of every 60 degrees from 0 degrees, or an electrical angle of every 60 degrees from 30 degrees), the electrical angle θvd^ estimated according to the first method is replaced (subjected to an override) with an electrical angle (any one of θ0^, θ01^, θ0e^, and θ01e^) estimated according to the second method. In a region in which an angular velocity is intermediate, when the electrical angle θvd^ is estimated according to the first method or the electrical angle θo^ is estimated according to the third method, in a predetermined electrical angle, the electrical angle θvd^ estimated according to the first method or the electrical angle θo^ estimated according to the third method is replaced with an electrical angle (any one of θ0^, θ01^, and θ0e^) estimated according to the second method. In a region in which an angular velocity is high, when the electrical angle θo^ is estimated according to the third method, in a predetermined electrical angle, the electrical angle θ0^ estimated according to the third method is replaced with an electrical angle (any one of θ0^, θ01^, and θ0e^) estimated according to the second method.

Figure 9:
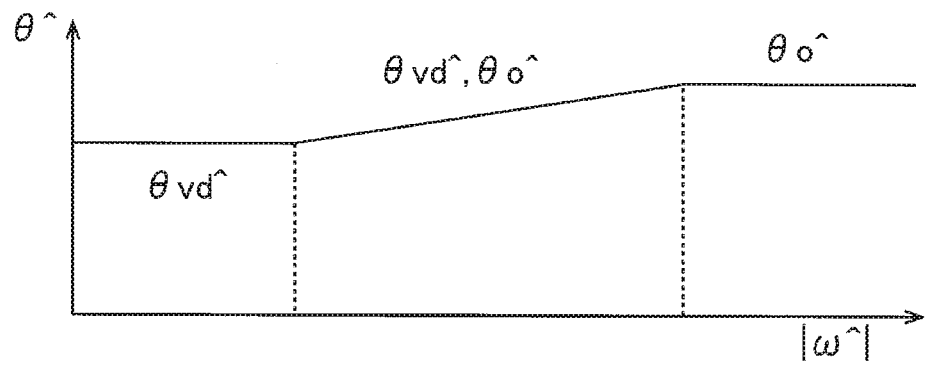
FIG. 9 is a diagram for describing switching between the first method and a third method.

As illustrated in FIG. 9, in the region in which an angular velocity is intermediate, switching between estimation of the electrical angle θvd^ according to the first method and the electrical angle θo^ according to the third method occurs. In a case where an angular velocity (|ω^|) is relatively low, the electrical angle θvd^ is estimated according to the first method, and, in a case where an angular velocity is relatively high, the electrical angle θo^ is estimated according to the third method. In a case where an angular velocity is substantially intermediate, combined calculation of the first method and the third method is performed.

The override is performed at a timing at which a phase current difference or a line current difference is zero. Specifically, a timing at which a phase current difference is zero (zero-cross) is every 60 degrees from 0 degrees. A timing at which a line current difference is zero is every 60 degrees from 30 degrees.

In a case where the zero-cross cannot be detected for a while, for example, the zero vector (active zero vector) is forced to be applied around an electrical angle of every 60 degrees from 0 degrees. Consequently, an electrical angle (θ0^, θ01^, θ0e^, and θ01e^) is detected according to the second method.

In a case of overmodulation and in a nonlinear region, for example, the zero vector (active zero vector) is forced to be applied around an electrical angle of every 60 degrees from 0 degrees. Consequently, an electrical angle (θ0^ and θ0e^) is detected according to the second method.

Figure 10:
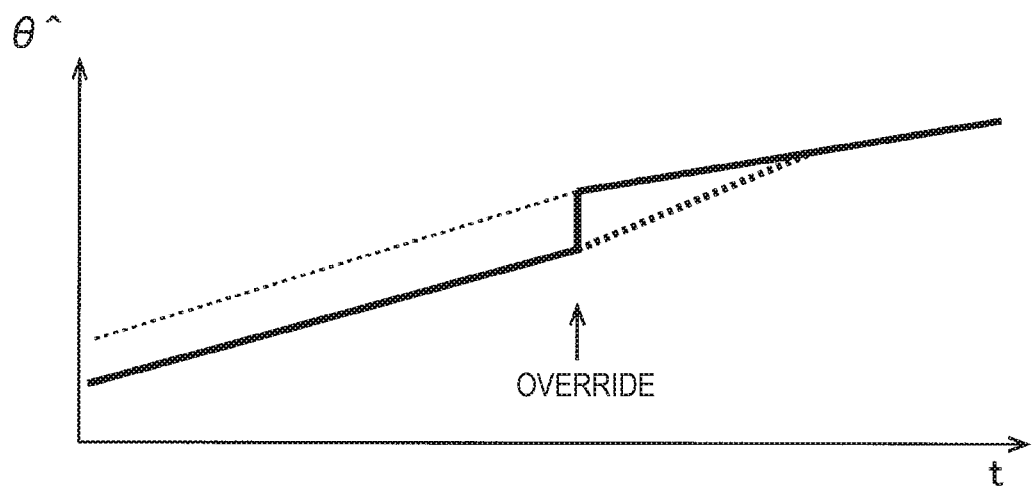
FIG. 10 is a diagram for describing smoothing of an estimated electrical angle.

An electrical angle estimated value includes an estimated value for electrical angle estimation and an electrical angle estimated value for control (speed control and position control). The estimated value for electrical angle estimation is an estimated value (an immediate value ωs^; refer to a thick solid line in FIG. 10) that is estimated according to the first to third methods. On the other hand, as illustrated in FIG. 10, since there is a case where an estimated electrical angle has a discrete value (a value rapidly changes) due to an override, the electrical angle estimated value for control is subjected to smoothing (refer to a thick dotted line in FIG. 10). Specifically, smoothing is performed on a value of the latest electrical angle before the override to be proportional to the angular velocity ω. An electrical angle for angular velocity estimation is not subjected to smoothing. Consequently, it is possible to improve controllability while maintaining the accuracy of estimation of an electrical angle (angular velocity).

As shown in Table 1, the override is performed by using the electrical angle θ0e^ in a region in which an angular velocity is relatively high. This is because, in a case where a modulation rate becomes high, deviation from sinusoidal driving increases, and thus an error increases in the method of estimating the electrical angle θ0^. In the region in which an angular velocity is relatively high, it is possible to estimate an electrical angle with high accuracy on the basis of only the electrical angle θ0e^ (refer to the following Equation 25).

$$\cos θ^{\wedge\wedge}/\sin θ^{\wedge\wedge}=(Ld×piβ-(-R×iβ+ω×(Ld-Lq)×iα))/(-Ld×piα+(-ω×(Ld-Lq)×iβ-R×iα))$$ (Equation 25)

In addition, "(O)" in Table 1 indicates that estimation based on the electrical angle θ0^ is possible, and the estimation based on the electrical angle θ0^ is not performed for the above reason. Consequently, it is possible to reduce a load on the motor control device 100 and also to improve the responsiveness of estimation of an electrical angle. Since there is no boundary condition in the electrical angle θ0e^ represented by the above Equation 13, a zero-cross cannot be detected in a region in which an angular velocity is relatively high, but an electrical angle can be detected by using the electrical angle θ0e^ represented by the above Equation 13.

An angular velocity of a motor to which the method (θ0e^) based on a current value in the stationary coordinate system is applied is higher than an angular velocity of a motor to which the method (θ01e^) based on a current difference when two phases are short-circuited to each other is applied. Specifically, the electrical angle θe^ is estimated on the basis of the following Equation 26.

$$θe^{\wedge}=kθ01e×θ01e^{\wedge}+kθ0e×θ0e^{\wedge}$$ (Equation 26)

Figure 11:
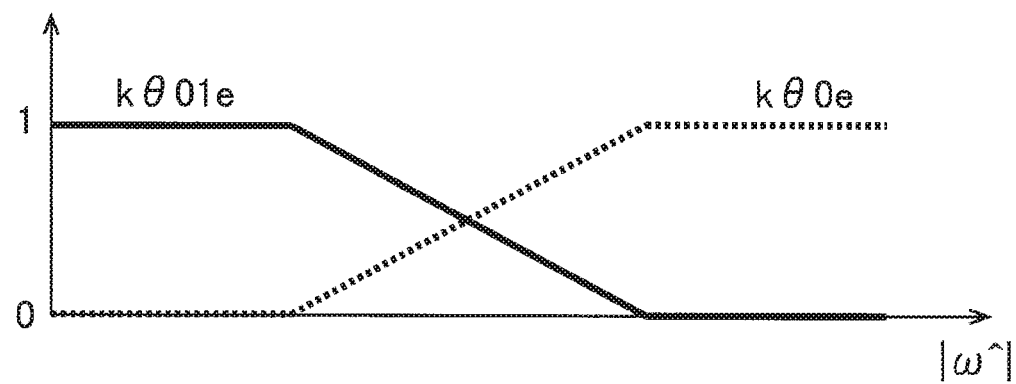
FIG. 11 is a diagram for describing switching (combined calculation) between $\theta 0e\hat{}$ and $\theta 01e\hat{}$.

Here, kθ01e and kθ0e are coefficients having characteristics illustrated in FIG. 11. kθ01e is 1 in a region in which the angular velocity |ω^| is relatively low, and is 0 in a region in which the angular velocity |ω^| is relatively high. kθ01e decreases linearly from 1 to 0 in a region in which the angular velocity |ω^| is substantially intermediate. kθ0e is 0 in a region in which the angular velocity |ω^| is relatively low, and is 1 in a region in which the angular velocity |ω^| is relatively high. kθ0e increases linearly from 0 to 1 in a region in which the angular velocity |ω^| is substantially intermediate. Consequently, it is possible to improve the accuracy of estimation of an electrical angle.

Figure 12:
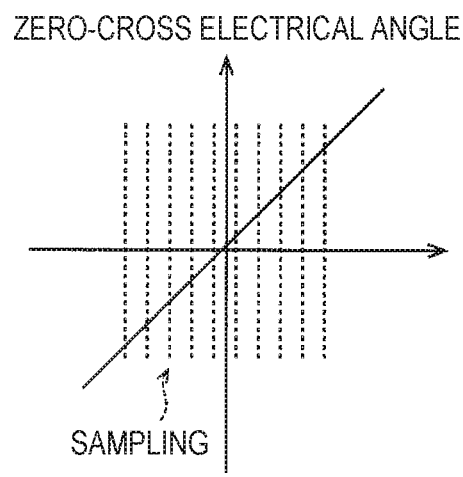
FIG. 12 is a diagram for describing a plurality of times of sampling.

In the second method, the electrical angle estimation unit 12 is configured to estimate an electrical angle by performing sampling for detecting an electrical angle a plurality of times, and performing movement averaging on results of the plurality of times of sampling. For example, as illustrated in FIG. 12, in estimation of the electrical angle θ0^ and the electrical angle θ01^, a plurality of times of sampling is performed (for example, ten times every 5 degrees) in an electrical angle around a zero-cross. A zero-cross is detected on the basis of a change in a sign of a differential movement average of a plurality of times of sampling. Similarly, for estimation of the electrical angle θ0e^ and the electrical angle θ01e^, a plurality of times of sampling is performed, and the electrical angle θ0e^ and the electrical angle θ01e^ are estimated on the basis of a movement average of sampling results. The number of times of sampling is increased as the angular velocity ω^ of the motor 200 becomes lower. For example, the number of times of sampling is exponentially increased as the angular velocity ω^ of the motor 200 becomes lower.

The override is performed on a first half and a second half of a pwm signal. On the other hand, the override may be performed for each cycle (every cycle or every two cycles) of the pwm signal. This is because, in the second method (electrical angle estimation using a current ripple), in a case where an equipment constant La/Ra (electrical time constant) of the motor 200 is large, a zero-cross may not be detected.

Figure 13:
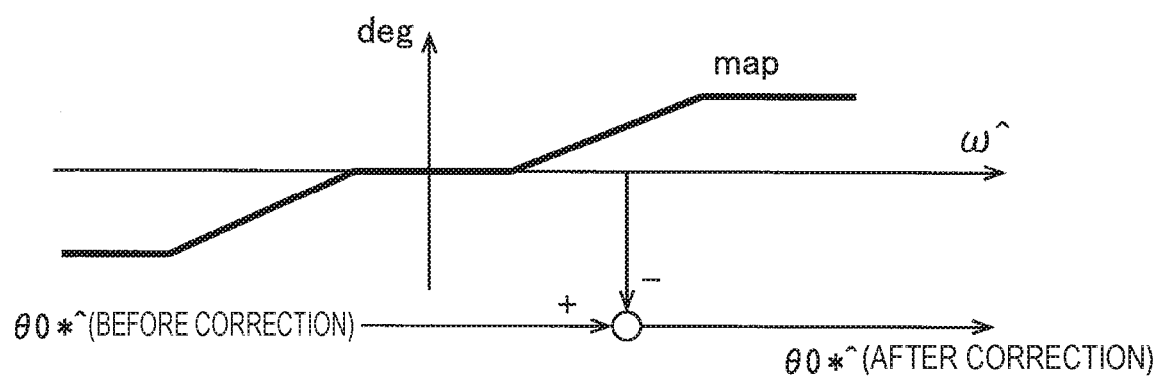
FIG. 13 is a diagram for describing correction of a phase of an electrical angle estimated according to a second method.

In the first embodiment, in the second method, the electrical angle estimation unit 12 is configured to compensate for a delay of an electrical angle estimated according to the second method on the basis of the equipment constant of the motor 200. Specifically, in a case where the angular velocity $|\omega\hat{}|$ is relatively high, the influence of the equipment constant La/Ra (electrical time constant) of the motor 200 cannot be disregarded, and thus a phase of an electrical angle estimated according to the second method is corrected. Specifically, as illustrated in FIG. 13, the correction is performed by subtracting an electrical angle (deg) shown in the map in FIG. 13 from the electrical angle $\theta 0^{*\hat{}}$ ($\theta 0\hat{}$ or $\theta 01\hat{}$) estimated according to the second method. Similarly, the electrical angles $\theta 0e\hat{}$ and $\theta 01e\hat{}$ are also corrected as necessary.

In the first embodiment, the electrical angle estimation unit 12 calculates the angular velocity $\omega\hat{}$ by performing time differentiation on an estimated electrical angle. For example, an angular velocity $\omega vd\hat{}$ is calculated on the basis of the electrical angle $\theta vd\hat{}$ estimated according to the first method. An angular velocity $\omega 0\hat{}$ is calculated on the basis of the electrical angles $\theta 0\hat{}$, $\theta 01\hat{}$, $\theta 0e\hat{}$, and $\theta 01e\hat{}$ estimated according to the second method. An angular velocity $\omega o\hat{}$ is calculated on the basis of the electrical angle $\theta o\hat{}$ estimated according to the third method. When the angular velocity $\omega 0\hat{}$ is estimated according to the second method, the angular velocity $\omega o\hat{}$ estimated according to the third method is replaced (subjected to an override) with the angular velocity $\omega 0\hat{}$ estimated according to the second method. The angular velocity $\omega\hat{}$ is calculated on the basis of time differentiation of the latest estimated electrical angle.

In the same manner as the estimation of an electrical angle, since there is a case where an estimated angular velocity has a discrete value (a value rapidly changes) due to an override on an angular velocity, an angular velocity estimated value for control is subjected to smoothing. An angular velocity for angular velocity estimation is not subjected to smoothing.

In the first embodiment, as shown in Table 1, when the motor 200 steps out, the electrical angle estimation unit 12 estimates an initial position ($\Delta\theta p\hat{}$) of the motor 200 on the basis that voltages are applied to the permanent magnets of the motor 200 in a case where the angular velocity $\omega\hat{}$ of the motor 200 is around zero. In a case where the angular velocity $\omega\hat{}$ of the motor 200 is more than around zero, the electrical angle estimation unit 12 continuously estimates an electrical angle according to the first method ($\theta vd\hat{}$) and the second method (only $\theta 0\hat{}$ or both of $\theta 0\hat{}$ and $\theta 0e\hat{}$). In a case where step-out of the motor 200 is detected a predetermined number of times or more within a predetermined period, the electrical angle estimation unit 12 is configured to stop the motor 200. In a case where deviation between an estimated electrical angle and a zero-cross timing is great, step-out resultantly occurs. On the other hand, in the first embodiment, since the override is performed at the zero-cross timing, the step-out does not occur logically. However, the step-out may occur at the time of a rapid change of the angular velocity $\omega\hat{}$. Therefore, the above-described measure is performed.

Effects of First Embodiment

In the first embodiment, the following effects can be achieved.

In the first embodiment, as described above, in a case where an electrical angle ($\theta vd\hat{}$ and $\theta o\hat{}$) of the motor 200 is estimated according to at least one of the first method and the third method, with respect to an electrical angle ($\theta 0\hat{}$, $\theta 01\hat{}$, $\theta 0e\hat{}$, and $\theta 01e\hat{}$) estimated according to the second method, the electrical angle estimation unit 12 is configured to replace the electrical angle ($\theta vd\hat{}$ and $\theta o\hat{}$) estimated according to at least one of the first method and the third method with the electrical angle ($\theta 0\hat{}$, $\theta 01\hat{}$, $\theta 0e\hat{}$, and $\theta 01e\hat{}$) estimated according to the second method. Here, in the second method, an electrical angle ($\theta 0\hat{}$, $\theta 01\hat{}$, $\theta 0e\hat{}$, and $\theta 01e\hat{}$) can be relatively accurately estimated by detecting a timing (zero-cross timing) at which a phase current difference or a line current difference is zero. Consequently, in a case where an electrical angle ($\theta vd\hat{}$ and $\theta o\hat{}$) is successively estimated according to at least one of the first method and the third method, even though an error occurs in the estimated electrical angle ($\theta vd\hat{}$ and $\theta o\hat{}$), the error can be corrected by using the electrical angle ($\theta 0\hat{}$, $\theta 01\hat{}$, $\theta 0e\hat{}$, and $\theta 01e\hat{}$) estimated according to the second method at the zero-cross timing. As a result, in a case where an electrical angle is successively estimated, it is possible to correct an error in an estimated electrical angle.

In the first embodiment, as described above, since the first method in which the accuracy of estimation of the electrical angle $\theta vd\hat{}$ is relatively high is used in a case where the angular velocity $\omega\hat{}$ of the motor 200 is low, and the third method in which the accuracy of estimation of the electrical angle $\theta o\hat{}$ is relatively high is used in a case where the angular velocity $\omega\hat{}$ of the motor 200 is high, it is possible to perform estimation of an electrical angle with high accuracy in both of the cases where the angular velocity $\omega\hat{}$ of the motor 200 is low and high. As a result, it is possible to correct an error in an estimated electrical angle while performing estimation of an electrical angle with high accuracy in both of the cases where the angular velocity $\omega\hat{}$ of the motor 200 is low and high.

In the first method and the third method, in a case of overmodulation of a pwm signal and in a nonlinear region, estimation of an electrical angle cannot be performed with high accuracy. Therefore, a zero-cross timing is detected according to the second method, and thus an electrical angle can be relatively accurately estimated even in the case of overmodulation of a pwm signal and in the nonlinear region.

In the first embodiment, as described above, in the second method, an electrical angle can be estimated at only a zero-cross timing (30 degrees, 60 degrees, 90 degrees, and the like), and thus electrical angles at timings other than the zero-cross timing can be estimated by performing interpolation calculation.

In the first embodiment, as described above, when a zero-cross timing cannot be detected according to the second method, an electrical angle may be estimated on the basis of Equations 21 and 22.

In the first embodiment, as described above, in the second method, an electrical angle ($\theta 0\hat{}$, $\theta 01\hat{}$, $\theta 0e\hat{}$, and $\theta 01e\hat{}$) is estimated on the basis of a current (a phase current and a line current), and thus a phase may be delayed with respect to a voltage. Therefore, a delay of the electrical angle ($\theta 0\hat{}$, $\theta 01\hat{}$, $\theta 0e\hat{}$, and $\theta 01\hat{}$) (phase) is compensated for, and thus it is possible to improve the accuracy of estimation of the electrical angle ($\theta 0\hat{}$, $\theta 01\hat{}$, $\theta 0e\hat{}$, and $\theta 01e\hat{}$).

In the first embodiment, as described above, even in a case where an electrical angle cannot be appropriately estimated according to the method ($\theta 0\hat{}$) based on a phase current difference and the method ($\theta 01\hat{}$) based on a line current difference, an electrical angle can be estimated according to the method (θ0e^) based on a current value in the stationary coordinate system and the method (θ01e^) based on a current difference when two phases are short-circuited to each other.

In the first embodiment, as described above, an electrical angle of the motor 200 is estimated on the basis of current values in two phases in which absolute values of the current values or absolute values of change amounts of currents are greater, and thus it is possible to improve noise resistance with respect to a current value and a change amount of the current value.

In the first embodiment, as described above, noise is reduced on the basis of a d-axis current value and a q-axis current value, and thus it is possible to increase the accuracy of estimation of an electrical angle (θ0e^).

In the first embodiment, as described above, a method (θ0e^ and θ01e^) for increasing the accuracy of estimation of an electrical angle is selected depending on an angular velocity of the motor 200, and thus it is possible to further increase the accuracy of estimation of an electrical angle.

In the first embodiment, as described above, even in a case where noise is included in a current (a phase current or a line current), it is possible to reduce the influence of the noise.

In the first embodiment, as described above, even in a case where a change rate of a q-axis current is high, an electrical angle (θvd^) can be appropriately estimated according to the first method.

In the first embodiment, as described above, even in a case where magnetic flux is saturated, an electrical angle (θvd^) can be appropriately estimated.

In the first embodiment, as described above, it is possible to suppress an estimated electrical angle (θ0^ and θ01^) from rapidly changing.

In the first embodiment, as described above, in a case where the angular velocity ω^ of the motor 200 is around zero, an initial position of the motor 200 is estimated, and thus it is possible to estimate the subsequent electrical angle with high accuracy. In a case where step-out of the motor 200 is detected a predetermined number of times or more within a predetermined period, the motor 200 is stopped, and thus it is possible to prevent driving of the motor 200 from being continued in a state in which the motor 200 steps out.

In the first embodiment, as described above, the angular velocity ω0^ is substituted on the basis of the electrical angles θ0^, θ01^, θ0e^, and θ01e^ estimated according to the second method in which an electrical angle can be relatively accurately estimated, and thus it is possible to improve the accuracy of estimation of an electrical angle and also to improve the robustness of the estimation of an electrical angle.

In the first embodiment, as described above, even in a case where it is difficult to estimate the electrical angle θvd^ according to the first embodiment due to a relatively small difference between the q-axis inductance Lq and the d-axis inductance Ld, it is possible to easily estimate the electrical angle θvd^ by increasing a difference between the q-axis inductance Lq and the d-axis inductance Ld.

Second Embodiment

With reference to FIGS. 14 to 18, a description will be made of a configuration of the motor control device 100 according to a second embodiment. In the second embodiment, a current is detected (single-shunt method) by a single shunt resistor 20 unlike in the first embodiment in which a current is detected by the three shunt resistors 20.

Figure 14:
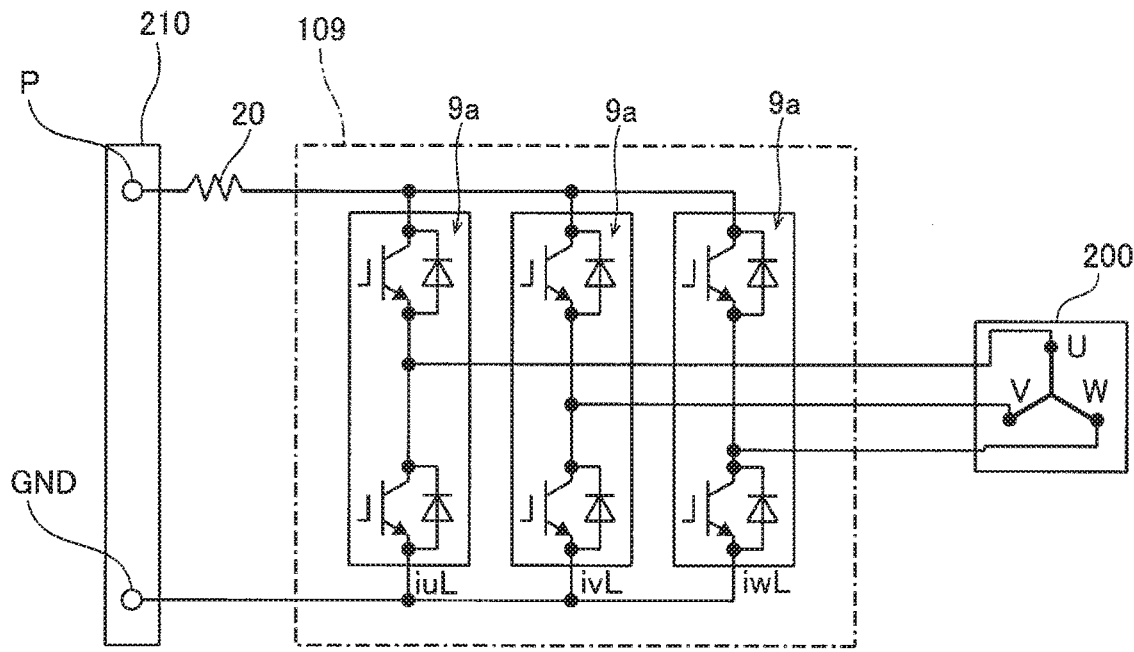
FIG. 14 is a diagram for describing current detection according to a single-shunt method according to a second embodiment disclosed here.

Specifically, as illustrated in FIG. 14, the shunt resistor 20 (current detection portion) is provided in a drive unit 109 of the motor control device 100. For example, the shunt resistor 20 is configured to detect a current flowing through a DC side (positive side: P) of 3-phase AC for supplying power from a power supply unit 210 to the motor 200. The shunt resistor 20 may be configured to detect a current flowing through a GND side. Phase currents on the downstream side of the switching elements 9a are indicated by iuL, ivL, and iwL.

Figure 15:
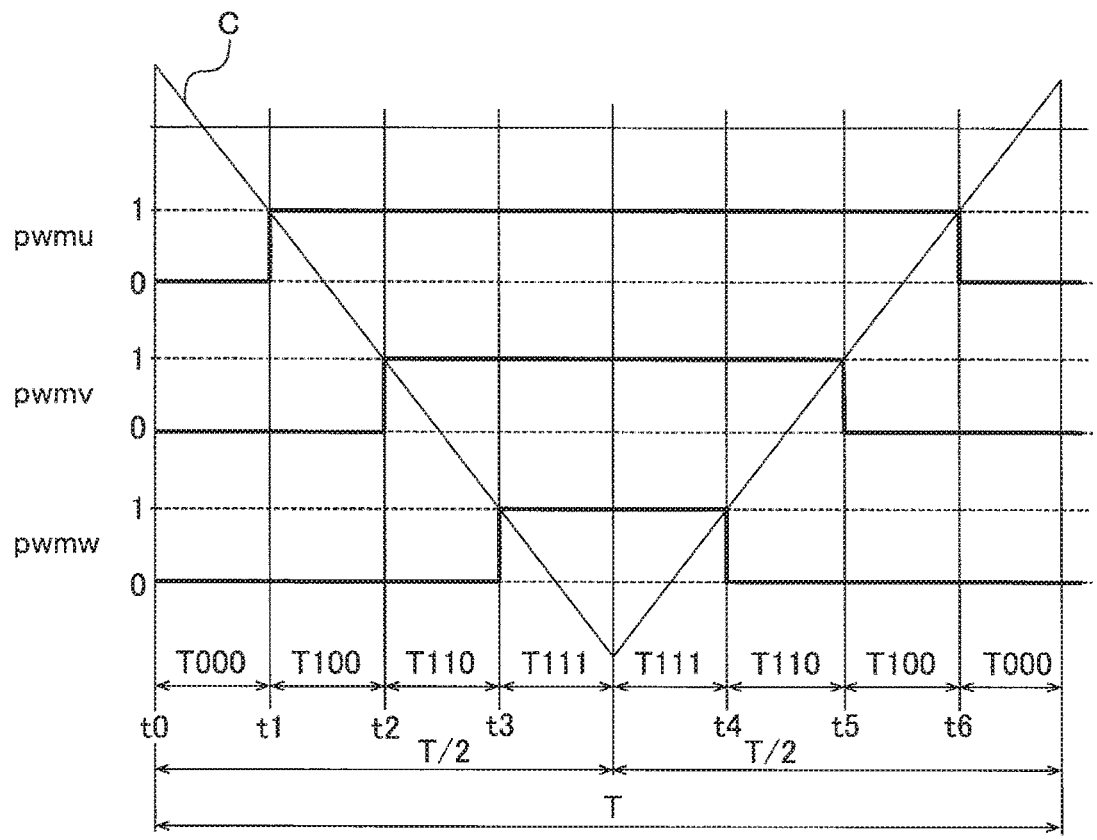
FIG. 15 is a diagram for describing a PWM signal.

FIG. 15 illustrates an example of one cycle of a PWM signal pwm*. A length of one cycle is referred to as a period T, a start point of the cycle is referred to as a start point t0, and a period in which a voltage is applied from the power supply unit 210 to only the U phase is referred to as T100. Applying a voltage from the power supply unit 210 will be referred to as "voltage application", and not applying a voltage will be referred to as "voltage nonapplication". A period of U phase voltage application, V phase voltage application, and W phase voltage nonapplication is referred to as T110, a period of U phase voltage application, V phase voltage application, and W phase voltage application is referred to as T111, and a period of U phase voltage nonapplication, V phase voltage nonapplication, and W phase voltage nonapplication is referred to as T000. A "zero vector" is assumed to indicate a state in the period T000.

As illustrated in FIG. 15, as an example, in the period T100, a detected current ir, the phase currents iu, iv, and iw, and the phase currents iuL, ivL, and iwL have a relationship represented by the following Equation 27. The currents have a relationship represented by the following Equation 28 in the period T110. At the start point t0, a current iut0 (iu at the start point t0), ivt0 (iv at the start point t0), and iwt0 (iw at the start point t0) have a relationship represented by the following Equation 29.

$$iu=ivL+iwL=ir \qquad \text{(Equation 27)}$$

$$iw=-iwL=-ir \qquad \text{(Equation 28)}$$

$$ivt0=0-iut0-iwt0 \qquad \text{(Equation 29)}$$

Here, in the second method, in a case where a current supplied to the motor 200 is detected by the single shunt resistor 20, the electrical angle estimation unit 12 does not use the method (electrical angle θ0^) based on a phase current difference and the method (electrical angle θ0e^) based on a current value in the stationary coordinate system in the second method. This is because, in the single-shunt method, a circulating current in a zero vector state (a state in which all the switching elements 9a of an upper arm or a lower arm are turned off) cannot be detected. The electrical angle estimation unit 12 is configured to estimate an electrical angle according to at least one of the method (electrical angle θ01^) based on a line current difference and the method (electrical angle θ01e^) based on a current difference when two phases are short-circuited to each other (in the second embodiment, both of the methods).

Figure 16:
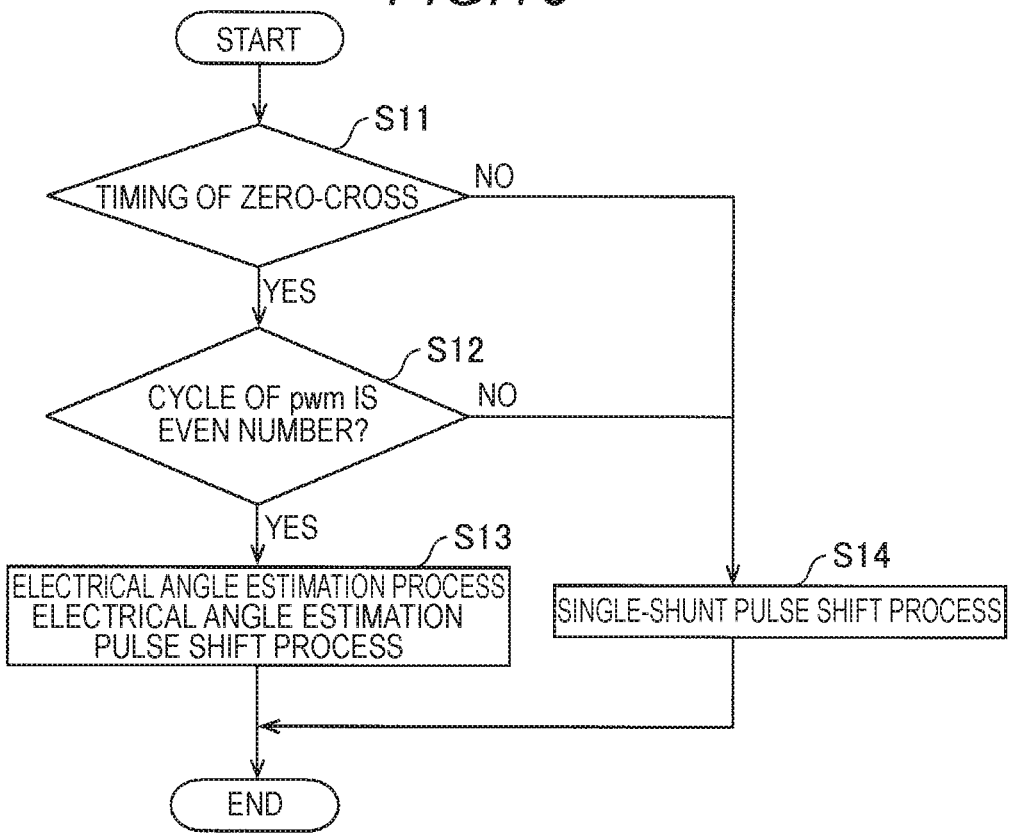
FIG. 16 is a flowchart for describing a process of estimating an electrical angle according to a second method according to the second embodiment disclosed here.

Specifically, the following process is performed. First, as illustrated in FIG. 16, in step S11, it is determined whether or not the motor 200 is in a zero-cross state (a phase current difference is 0). A zero-cross timing (electrical angle) is 30 degrees, 90 degrees, 150 degrees, 210 degrees, 270 degrees, and 330 degrees. Actually, the zero-cross timing (electrical angle) is within a range of the angles ±k0 deg.

In a case of yes in step S11, in step S12, it is determined whether or nota cycle of pwm is an even number.

Figure 17:
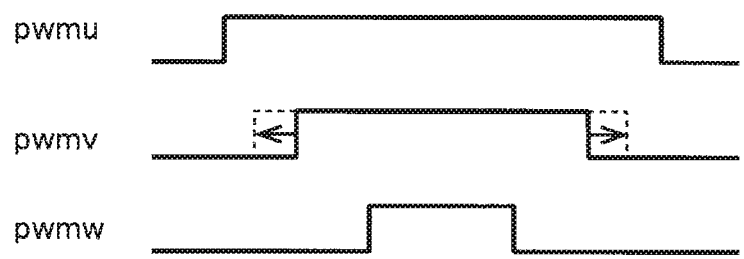
FIG. 17 is a diagram for describing an electrical angle estimation pulse shift process.

In a case of yes in step S12 (the cycle of pwm is an even number), in step S13, an electrical angle is estimated according to at least one of the method (electrical angle θ01^) based on a line current difference and the method (electrical angle $\theta01e\hat{}$) based on a current difference when two phases are short-circuited to each other. In step S12, an electrical angle estimation pulse shift process is performed. The electrical angle estimation pulse shift process is a process for securing the minimum time for detecting a state in which two phases are short-circuited to each other even in a case where the state in which two phases are short-circuited to each other cannot be detected through a single-shunt pulse shift process which will be described later. Specifically, as illustrated in FIG. 17, a pulse width of a pwm signal is increased and decreased in order to secure the minimum time for detecting a state in which two phases are short-circuited to each other. For example, at a timing at which a current is detected, a pulse width of a pwm signal (pwmv) is increased (refer to a dotted line in FIG. 17). A pulse width of the pwm signal is decreased at another timing in order to complement the increase of the pulse width of the pwm signal. Consequently, the output amount of whole current is not changed. A current value detected through the electrical angle estimation pulse shift process is used for current control.

Figure 18:
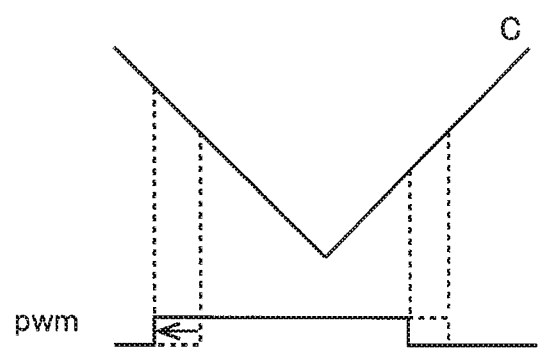
FIG. 18 is a diagram for describing a single-shunt pulse shift process.

In a case of no in step S11 and no in step S12 (in a case where the cycle of pwm is an odd number), the flow proceeds to step S14. In step S14, the single-shunt pulse shift process is performed. As illustrated in FIG. 18, the single-shunt pulse shift process is a process of moving (shifting) a pulse width of a pwm signal with respect to a triangular wave C such that a pulse of the pwm signal is generated at the time at which a detection current is detected. As mentioned above, the electrical angle estimation pulse shift process is different from the single-shunt pulse shift process in terms of processing method. Therefore, as described above, the electrical angle estimation pulse shift process and the single-shunt pulse shift process are switched to each other depending on whether a cycle of pwm is an even number or an odd number, and thus it is possible to suppress interference in both of the processes.

Remaining configurations of the second embodiment are the same as those of the first embodiment.

Effects of Second Embodiment

In the second embodiment, the following effects can be achieved.

In the second embodiment, as described above, according to the method (electrical angle $\theta01\hat{}$) based on a line current difference and the method (electrical angle $\theta01e\hat{}$) based on a current difference when two phases are short-circuited to each other, it is possible to estimate an electrical angle even in a case where a current supplied to the motor 200 is detected by the single shunt resistor 20 (in a case where a current value is detected at a separate time point for each phase). As a result, it is possible to appropriately estimate an electrical angle even in a case where a current supplied to the motor 200 is detected by the single shunt resistor 20.

Third Embodiment

A description will be made of a configuration of the motor control device 100 according to a third embodiment. In the third embodiment, an electrical angle $\theta ev\hat{}$ is estimated on the basis of an induced voltage in an off vector state unlike in the second embodiment in which an electrical angle is estimated on the basis of the electrical angle $\theta01\hat{}$ and the electrical angle $\theta01e\hat{}$.

The second method further includes a method of estimating an electrical angle on the basis of an induced voltage in a zero vector state in a case where a current supplied to the motor 200 is detected by a single shunt resistor 20. Specifically, in the motor control device 100, the electrical angle $\theta ev\hat{}$ is estimated on the basis of a line induced voltage as shown in the following Equation 30.

$$V\alpha=(2/3)\times(Euv-Evw/2-Ewu/2)$$

$$V\beta=(1/\sqrt{3})\times(Evw-Ewu)$$

$$\theta ev\hat{}=\tan^{-1}(V\beta/V\alpha)-\pi/2-\pi/6 \quad \text{(Equation 30)}$$

Here, Euv indicates a line induced voltage between the U phase and the V phase, and Evw indicates a line induced voltage between the V phase and the W phase. Ewu indicates a line induced voltage between the W phase and the U phase.

Specifically, the line induced voltages are represented by the following Equation 31.

$$Eu\hat{}=Eu-E0=-\text{kvgain}\times ke\times\omega\times\sin(\theta)$$

$$Ev\hat{}=Ev-E0=-\text{kvgain}\times ke\times\omega\times\sin(\theta-2\times\pi/3)$$

$$Ew\hat{}=Ew-E0=-\text{kvgain}\times ke\times\omega\times\sin(\theta-4\times\pi/3) \quad \text{(Equation 31)}$$

Here, ke indicates a counter-electromotive force constant, and kvgain indicates a voltage read gain. Here, Eu, Ev, and Ew respectively indicate terminal induced voltages with the U phase, the V phase, and the W phase. In addition, $\omega$ indicates an electrical angular velocity.

The electrical angle $\theta ev\hat{}$ switches between angles depending on whether the motor 200 is rotated clockwise (cw) or counterclockwise (ccw). Specifically, when the motor 200 is rotated clockwise (cw), the electrical angle $\theta ev\hat{}$ is still $\theta ev\hat{}$ ($\theta ev\hat{}=\theta ev\hat{}$). On the other hand, when the motor 200 is rotated counterclockwise (ccw), the electrical angle $\theta ev\hat{}$ switches to $\theta ev\hat{}-\pi$ ($\theta ev\hat{}=\theta ev\hat{}-\pi$).

In the motor control device 100, the electrical angle $\theta ev\hat{}$ may be estimated on the basis of a phase voltage (a terminal induced voltage between a neutral point and a terminal with each phase) as shown in the following Equation 32.

$$V\alpha=(2/3)\times(Eu\hat{}-Ev\hat{}/2-Ew\hat{}/2)$$

$$V\beta=(1/\sqrt{3})\times(Ev\hat{}-Ew\hat{})$$

$$\theta ev\hat{}=\tan^{-1}(V\beta/V\alpha)-\pi/2 \quad \text{(Equation 32)}$$

The electrical angle $\theta ev\hat{}$ estimated on the basis of a phase voltage switches between angles depending on whether the motor 200 is rotated clockwise (cw) or counterclockwise (ccw).

The terminal induced voltages are represented by the following Equation 33.

$$Eu\hat{}=Eu-E0=-\text{kvgain}\times ke\times\omega\times\sin(\theta)$$

$$Ev\hat{}=Ev-E0=-\text{kvgain}\times ke\times\omega\times\sin(\theta-2\times\pi/3)$$

$$Ew\hat{}=Ew-E0=-\text{kvgain}\times ke\times\omega\times\sin(\theta-4\times\pi/3) \quad \text{(Equation 33)}$$

Here, Eu, Ev, and Ew respectively indicate terminal induced voltages with the U phase, the V phase, and the W phase. The neutral point is required to be detected by hardware or to be estimated by software. A voltage $E0\hat{}$ of the neutral point is calculated on the basis of a relationship equation of $E0\hat{}=Eu+Ev+Ew$.

In the method of estimating the electrical angle $\theta ev\hat{}$ according to the third embodiment, a current value read according to the electrical angle estimation pulse shift process of the second embodiment is not used for current control. This is because the read current value is a current value in a zero vector state (off vector state).

In the method of estimating the electrical angle θev^according to the third embodiment, a timing at which an off vector is applied is 0 degrees, 60 degrees, 120 degrees, 180 degrees, 240 degrees, and 300 degrees. Actually, the timing at which an off vector is applied is within a range of the angles ±k0 deg. In this case, since a difference between the terminal induced voltages is not taken, the off vector is applied once.

Remaining configurations of the third embodiment are the same as those of the first and second embodiments.

Effects of Third Embodiment

In the third embodiment, the following effects can be achieved.

In the third embodiment, as described above, in the method of estimating an electrical angle on the basis of an induced voltage in an off vector state, robustness is higher than in the method based on a line current difference and the method based on a current difference when two phases are short-circuited to each other, and thus it is possible to more appropriately estimate an electrical angle.

Modification Examples

It is considered that the embodiments disclosed here are exemplary and are not limited in any aspect. The scope of the present invention is exhibited not by the description of the embodiments but by the claims, and includes all changes (modification examples) within the claims and the meaning and the scope of equivalents thereof.

For example, in the first to third embodiments, a description has been made of an example of applying any one of the first method, the second method, and the third method on the basis of Table 1, but the present invention is not limited thereto. Table 1 is only an example, and any one of the first method, the second method, and the third method may be applied on the basis of application methods other than the application method (application range) shown in Table 1.

In the first to third embodiments, a description has been made of an example in which, in the second method, an electrical angle is estimated on the basis of the above Equations 21 and 22 when a phase current difference is not zero and when a line current difference is not zero, but the present invention is not limited thereto. In the present invention, an electrical angle may not be estimated on the basis of the above Equations 21 and 22.

In the first to third embodiments, a description has been made of an example of performing a process of estimating an initial position of a motor when the motor steps out, but the present invention is not limited thereto. As described above, since an override is performed at a zero-cross timing, and thus step-out does not occur logically, the process when the motor steps out may be not performed.

In the second embodiment, a description has been made of an example in which the electrical angle estimation pulse shift process and the single-shunt pulse shift process are alternately performed with respect to a cycle (an even number and an odd number) of pwm, but the present invention is not limited thereto. For example, the electrical angle estimation pulse shift process may be performed once with respect to a plurality of single-shunt pulse shift processes.

A motor control device according to an aspect of the present invention controls driving of a motor provided with a permanent magnet in response to a d-axis current command and a q-axis current command that are set on the basis of a torque command, and the motor control device includes an electrical angle estimation unit configured to estimate an electrical angle of the motor according to at least one of a first method of estimating the electrical angle of the motor on the basis that a leakage current in a q axis becomes zero by applying a voltage to a d axis and, a second method of estimating the electrical angle of the motor on the basis of at least one of a phase current difference and a line current difference caused by an induced voltage generated due to rotation of the motor becomes zero, and a third method of estimating the electrical angle on the basis of a voltage equation, depending on an angular velocity of the motor, a modulation rate of a pwm signal, and whether a magnetic flux change is included in a nonlinear region in which the magnetic flux change is nonlinear, in which, in a case where the electrical angle of the motor is estimated according to at least one of the first method and the third method, with respect to the electrical angle estimated according to the second method, the electrical angle estimation unit is configured to replace the electrical angle estimated according to at least one of the first method and the third method with the electrical angle estimated according to the second method.

In the motor control device according to the aspect of the present invention, as described above, in a case where the electrical angle of the motor is estimated according to at least one of the first method and the third method, with respect to the electrical angle estimated according to the second method, the electrical angle estimation unit is configured to replace the electrical angle estimated according to at least one of the first method and the third method with the electrical angle estimated according to the second method. Here, in the second method, an electrical angle can be relatively accurately estimated by detecting a timing (zero-cross timing) at which at least one of the phase current difference and the line current difference is zero. Consequently, in a case where an electrical angle is successively estimated according to at least one of the first method and the third method, even though an error occurs in the estimated electrical angle, the error can be corrected by using the electrical angle estimated according to the second method at the zero-cross timing. As a result, in a case where an electrical angle is successively estimated, it is possible to correct an error in an estimated electrical angle.

In the motor control device according to the aspect, it is preferable that the electrical angle estimation unit is configured to estimate the electrical angle according to the first method and the second method in a case where the angular velocity of the motor is low, and estimate the electrical angle according to the second method and the third method in a case where the angular velocity of the motor is high.

With this configuration, since the first method in which the accuracy of estimation of an electrical angle is relatively high is used in a case where an angular velocity of the motor is low, and the third method in which the accuracy of estimation of an electrical angle is relatively high is used in a case where the angular velocity of the motor is relatively high, it is possible to perform estimation of an electrical angle with high accuracy in both of the cases where the angular velocity of the motor is low and high. As a result, it is possible to correct an error in an estimated electrical angle while performing estimation of an electrical angle with high accuracy in both of the cases where the angular velocity of the motor is low and high.

In the motor control device according to the aspect, it is preferable that, in a case of overmodulation in which the modulation rate of the pwm signal is 1 or greater and in the nonlinear region in which the magnetic flux change is nonlinear, the electrical angle estimation unit is configured to estimate the electrical angle according to the second method.

Here, in the first method and the third method, in a case of overmodulation of a pwm signal and in a nonlinear region, estimation of an electrical angle cannot be performed with high accuracy. Therefore, with this configuration, a zero-cross timing is detected according to the second method, and thus an electrical angle can be relatively accurately estimated even in the case of overmodulation of a pwm signal and in the nonlinear region.

In this case, it is preferable that, in the second method in the nonlinear region in which the magnetic flux change is nonlinear, the electrical angle estimation unit is configured to estimate a plurality of predetermined electrical angles, and estimate an electrical angle between the predetermined electrical angles through interpolation calculation.

with this configuration, as described above, in the second method, an electrical angle can be estimated at only a zero-cross timing (30 degrees, 60 degrees, 90 degrees, and the like), and thus electrical angles at timings other than the zero-cross timing can be estimated by performing interpolation calculation.

In the motor control device according to the aspect, it is preferable that, in the second method, when the phase current difference is not zero and when the line current difference is not zero, the electrical angle estimation unit is configured to estimate an electrical angle at which the phase current difference is zero and an electrical angle at which the line current difference is zero on the basis of the following Equations 4 and 5:

$$\theta 0c\hat{} = \theta 0t\hat{} - \Delta i^* \times \omega\hat{}/\Delta\Delta 1^* \quad \text{(Equation 4)}$$

$$\theta 10c\hat{} = \theta 01t\hat{} - \Delta i^* \times \omega\hat{}/\Delta\Delta 1^* \quad \text{(Equation 5)}$$

where, $\theta 0t\hat{}$ and $\theta 01t\hat{}$ respectively indicate target values (predetermined electrical angles), $\Delta i^*$ indicates a current difference, $\Delta\Delta 1^*$ indicates a change rate of $\Delta i^*$, and $*$ indicates the d axis or the q axis.

With this configuration, when a zero-cross timing cannot be detected according to the second method, an electrical angle can be estimated on the basis of Equations 4 and 5.

In the motor control device according to the aspect, it is preferable that, in the second method, the electrical angle estimation unit is configured to compensate for a delay of the electrical angle estimated according to the second method on the basis of an equipment constant of the motor.

In this configuration, in the second method, an electrical angle is estimated on the basis of a current (a phase current and a line current), and thus a phase may be delayed with respect to a voltage. Therefore, with this configuration, a delay of the electrical angle (phase) is compensated for, and thus it is possible to improve the accuracy of estimation of the electrical angle.

In the motor control device according to the aspect, it is preferable that the second method includes a method based on a current value in a stationary coordinate system and a method based on a current difference when two phases are short-circuited to each other, in addition to a method based on the phase current difference and a method based on the line current difference.

With this configuration, even in a case where an electrical angle cannot be appropriately estimated according to the method based on a phase current difference and the method based on a line current difference, an electrical angle can be estimated according to the method based on a current value in the stationary coordinate system and the method based on a current difference when two phases are short-circuited to each other.

In this case, in the motor control device according to the aspect, it is preferable that, in the method based on the current value in the stationary coordinate system, the electrical angle estimation unit is configured to estimate the electrical angle of the motor on the basis of current values in two phases in which absolute values of current values or absolute values of change amounts of currents are greater among three phases.

With this configuration, it is possible to improve noise resistance with respect to a current value and a change amount of the current value.

In the motor control device in which the second method includes the method based on the current value in the stationary coordinate system and the method based on the current difference when the two phases are short-circuited to each other, in the method based on the current value in the stationary coordinate system, it is preferable that the electrical angle estimation unit is configured to reduce noise on the basis of a d-axis current value and a q-axis current value.

With this configuration, noise is reduced, and thus it is possible to increase the accuracy of estimation of an electrical angle.

In the motor control device in which the second method includes the method based on the current value in the stationary coordinate system and the method based on the current difference when the two phases are short-circuited to each other, it is preferable that an angular velocity of the motor to which the method based on the current value in the stationary coordinate system is applied is higher than an angular velocity of the motor to which the method based on the current difference when the two phases are short-circuited to each other is applied.

With this configuration, a method for increasing the accuracy of estimation of an electrical angle is selected depending on an angular velocity of the motor, and thus it is possible to further increase the accuracy of estimation of an electrical angle.

In the motor control device in which the second method includes the method based on the current value in the stationary coordinate system and the method based on the current difference when the two phases are short-circuited to each other, it is preferable that, in a case where a current supplied to the motor is detected by a single shunt resistor, in the second method, the electrical angle estimation unit is configured to estimates the electrical angle according to the at least one of the method based on the line current difference and the method based on the current difference when the two phases are short-circuited to each other, instead of using the method based on the phase current difference and the method based on the current value in the stationary coordinate system.

With this configuration, according to at least one of the method based on the line current difference and the method based on the current difference when the two phases are short-circuited to each other, it is possible to estimate an electrical angle even in a case where a current supplied to the motor is detected by the single shunt resistor (in a case where a current value is detected at a separate time point for each phase). Consequently, it is possible to appropriately estimate an electrical angle even in a case where a current supplied to the motor is detected by the single shunt resistor.

In the motor control device in which the second method includes the method based on the current value in the stationary coordinate system and the method based on the current difference when the two phases are short-circuited to each other, it is preferable that, in a case where a current supplied to the motor is detected by a single shunt resistor, the second method further includes a method of estimating the electrical angle on the basis of an induced voltage in an off vector state. Here, the "off vector state" indicates that all switching elements are turned off in an H bridge circuit (power conversion circuit) including a plurality of switching elements (an upper arm and a lower arm).

With this configuration, in the method of estimating an electrical angle on the basis of an induced voltage in an off vector state, robustness is relatively higher than in the method based on the line current difference and the method based on the current difference when the two phases are short-circuited to each other, and thus it is possible to more appropriately estimate an electrical angle.

In the motor control device according to the aspect, it is preferable that, in the second method, the electrical angle estimation unit is configured to estimates an electrical angle by performing a plurality of times of sampling for detecting an electrical angle such that the number of times of sampling is increased as the angular velocity of the motor becomes lower, and performing movement averaging on results of the plurality of times of sampling.

With this configuration, even in a case where noise is included in a current (a phase current or a line current), it is possible to reduce the influence of the noise.

In the motor control device according to the aspect, it is preferable that, in the first method, the electrical angle estimation unit is configured to reduces an interval of sampling for estimating the electrical angle according to the first method in a case where a change rate of a q-axis current is high more than in a case where the change rate of the q-axis current is low.

With this configuration, even in a case where a change rate of a q-axis current is high, an electrical angle can be appropriately estimated according to the first method.

In the motor control device according to the aspect, it is preferable that, in the first method, the electrical angle estimation unit is configured to corrects an electrical angle estimated when magnetic flux is saturated on the basis of the following Equation 6:

$$\theta vd\hat{} = \theta vd\hat{} \times SV0/SV1$$

$$SV0 = \omega\hat{} \times Kt\hat{} idn0 + (Ld\hat{} idn0 - Lq\hat{} idn0) \times (\omega\hat{} x idrefn - piqrefn)$$

$$SV1 = \omega\hat{} \times Kt\hat{} idn + (Ld\hat{} idn - Lq\hat{} idn) \times (\omega\hat{} x idrefn - piqrefn)$$ (Equation 6)

where, ω indicates an angular velocity, Kt indicates a counter-electromotive force constant, Ld indicates d-axis inductance, Lq indicates q-axis inductance, idrefn indicates a d-axis current command value, iqrefn indicates a q-axis current command value, the subscript ind indicates the present value, the subscript ind0 indicates a value in a region in which magnetic flux of the motor is not saturated, and p indicates time differentiation.

With this configuration, even in a case where magnetic flux is saturated, an electrical angle can be appropriately estimated.

In the motor control device according to the aspect, it is preferable that, the electrical angle estimation unit is configured to performs a smoothing process such that values before and after replacement are continued when an estimated value that is estimated according to at least one of the first method and the third method is replaced with the electrical angle estimated according to the second method.

With this configuration, it is possible to suppress an estimated electrical angle from rapidly changing.

In the motor control device according to the aspect, it is preferable that, when the motor steps out, the electrical angle estimation unit is configured to estimate an initial position of the motor on the basis of a voltage being applied to the permanent magnet of the motor in a case where the angular velocity of the motor is around zero, continuously estimate the electrical angle in a case where the angular velocity of the motor is more than around zero, and stop the motor in a case where step-out of the motor is detected a predetermined number of times or more within a predetermined period.

With this configuration, in a case where an angular velocity of the motor is around zero, an initial position of the motor is estimated, and thus it is possible to estimate the subsequent electrical angle with high accuracy. In a case where step-out of the motor is detected a predetermined number of times or more within a predetermined period, the motor is stopped, and thus it is possible to prevent driving of the motor from being continued in a state in which the motor steps out.

In the motor control device according to the aspect, it is preferable that the electrical angle estimation unit is configured to perform time differentiation on the estimated electrical angle so as to calculate the angular velocity, and replace an angular velocity calculated on the basis of the electrical angle estimated according to the third method with an angular velocity calculated on the basis of the electrical angle estimated according to the second method.

With this configuration, an angular velocity is substituted on the basis of electrical angles estimated according to the second method in which an electrical angle can be relatively accurately estimated, and thus it is possible to improve the accuracy of estimation of an electrical angle and also to improve the robustness of the estimation of an electrical angle.

In the motor control device according to the aspect, it is preferable that, in the first method, in a case where a difference between q-axis inductance and d-axis inductance is less than a predetermined threshold value, the difference between the q-axis inductance and the d-axis inductance is increased by performing at least one of an increase of the q-axis inductance and a decrease of the d-axis inductance.

With this configuration, even in a case where it is difficult to estimate an electrical angle according to the first method due to a relatively small difference between the q-axis inductance and the d-axis inductance, it is possible to easily estimate an electrical angle by using the configuration.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A motor control device that controls driving of a motor provided with a permanent magnet in response to a d-axis current command and a q-axis current command that are set on the basis of a torque command, the motor control device comprising:

an electrical angle estimation unit configured to estimate an electrical angle of the motor according to at least one of a first method of estimating the electrical angle of the motor on the basis that a leakage current in a q axis becomes zero by applying a voltage to a d axis, a second method of estimating the electrical angle of the motor on the basis that at least one of a phase current difference and a line current difference caused by an induced voltage generated due to rotation of the motor becomes zero, and a third method of estimating the electrical angle on the basis of a voltage equation, depending on an angular velocity of the motor, a modulation rate of a pwm signal, and whether a magnetic flux change is included in a nonlinear region in which the magnetic flux change is nonlinear, wherein in a case where the electrical angle of the motor is estimated according to at least one of the first method and the third method, with respect to the electrical angle estimated according to the second method, the electrical angle estimation unit is configured to replace the electrical angle estimated according to at least one of the first method and the third method with the electrical angle estimated according to the second method.

2. The motor control device according to claim 1, wherein the electrical angle estimation unit is configured to estimate the electrical angle according to the first method and the second method in a case where the angular velocity of the motor is low, and estimate the electrical angle according to the second method and the third method in a case where the angular velocity of the motor is high.

3. The motor control device according to claim 1, wherein in a case of overmodulation in which the modulation rate of the pwm signal is 1 or greater and in the nonlinear region in which the magnetic flux change is nonlinear, the electrical angle estimation unit is configured to estimate the electrical angle according to the second method.

4. The motor control device according to claim 3, wherein in the second method in the nonlinear region in which the magnetic flux change is nonlinear, the electrical angle estimation unit is configured to estimate a plurality of predetermined electrical angles, and estimate an electrical angle between the predetermined electrical angles through interpolation calculation.

5. The motor control device according to claim 1, wherein in the second method, when the phase current difference is not zero and when the line current difference is not zero, the electrical angle estimation unit is configured to estimate an electrical angle at which the phase current difference is zero and an electrical angle at which the line current difference is zero on the basis of the following Equations 1 and 2:

$$\theta_0 c\hat{} = \theta_0 t\hat{} - \Delta i^* \times \omega\hat{} / \Delta\Delta 1^* \qquad \text{Equation 1)}$$

$$\theta_1 0\hat{} = \theta_0 1 t\hat{} - \Delta i^* \times \omega\hat{} / \Delta\Delta 1^* \qquad \text{Equation 2)}$$

where, $\theta_0 t\hat{}$ and $\theta_0 1 t\hat{}$ respectively indicate target values, $\Delta i^*$ indicates a current difference, $\Delta\Delta 1^*$ indicates a change rate of $\Delta i^*$, and * indicates the d axis or the q axis.

6. The motor control device according to claim 1, wherein in the second method, the electrical angle estimation unit is configured to compensate for a delay of the electrical angle estimated according to the second method on the basis of an equipment constant of the motor.

7. The motor control device according to claim 1, wherein the second method includes a method based on a current value in a stationary coordinate system and a method based on a current difference when two phases are short-circuited to each other, in addition to a method based on the phase current difference and a method based on the line current difference.

8. The motor control device according to claim 7, wherein in the method based on the current value in the stationary coordinate system, the electrical angle estimation unit is configured to estimate the electrical angle of the motor on the basis of current values in two phases in which absolute values of current values or absolute values of change amounts of currents are greater among three phases.

9. The motor control device according to claim 7, wherein in the method based on the current value in the stationary coordinate system, the electrical angle estimation unit is configured to reduce noise on the basis of a d-axis current value and a q-axis current value.

10. The motor control device according to claim 7, wherein
an angular velocity of the motor to which the method based on the current value in the stationary coordinate system is applied is higher than an angular velocity of the motor to which the method based on the current difference when the two phases are short-circuited to each other is applied.

11. The motor control device according to claim 7, wherein
in a case where a current supplied to the motor is detected by a single shunt resistor, in the second method, the electrical angle estimation unit is configured to estimate the electrical angle according to the at least one of the method based on the line current difference and the method based on the current difference when the two phases are short-circuited to each other, instead of using the method based on the phase current difference and the method based on the current value in the stationary coordinate system.

12. The motor control device according to claim 7, wherein
in a case where a current supplied to the motor is detected by a single shunt resistor (20), the second method further includes a method of estimating the electrical angle on the basis of an induced voltage in an off vector state.

13. The motor control device according to claim 1, wherein
in the second method, the electrical angle estimation unit is configured to estimate the electrical angle by performing a plurality of times of sampling for detecting an electrical angle such that the number of times of sampling is increased as the angular velocity of the motor becomes lower, and performing movement averaging on results of the plurality of times of sampling.

14. The motor control device according to claim 1, wherein
in the first method, the electrical angle estimation unit is configured to reduce an interval of sampling for estimating the electrical angle according to the first method in a case where a change rate of a q-axis current is high more than in a case where the change rate of the q-axis current is low.

15. The motor control device according to claim 1, wherein in the first method, the electrical angle estimation unit is configured to correct an electrical angle estimated when magnetic flux is saturated on the basis of the following Equation:

$$\theta vd\hat{}=\theta vd\hat{}\times(\omega\hat{}\times Kt\hat{}idn0+(Ld\hat{}idn0-Lq\hat{}idn0)\times(\omega\hat{}\times idrefn-piqrefn))/(\omega\hat{}\times Kt\hat{}idn+(Ld\hat{}idn-Lq\hat{}idn)\times(\omega\hat{}\times idrefn-piqrefn))$$

where, ω indicates an angular velocity, Kt indicates a counter-electromotive force constant, Ld indicates d-axis inductance, Lq indicates q-axis inductance, idrefn indicates a d-axis current command value, iqrefn indicates a q-axis current command value, the subscript ind indicates the present value, the subscript ind0 indicates a value in a region in which magnetic flux of the motor is not saturated, and p indicates time differentiation.

16. The motor control device according to claim 1, wherein
the electrical angle estimation unit is configured to perform a smoothing process such that values before and after replacement are continued when an electrical angle that is estimated according to at least one of the first method and the third method is replaced with the electrical angle estimated according to the second method.

17. The motor control device according to claim 1, wherein
when the motor steps out, the electrical angle estimation unit is configured to estimate an initial position of the motor on the basis of a voltage being applied to the permanent magnet of the motor in a case where the angular velocity of the motor is around zero, continuously estimate the electrical angle in a case where the angular velocity of the motor is more than around zero, and stop the motor in a case where step-out of the motor is detected a predetermined number of times or more within a predetermined period.

18. The motor control device according to claim 1, wherein
the electrical angle estimation unit is configured to perform time differentiation on the estimated electrical angle so as to calculate the angular velocity, and replace an angular velocity calculated on the basis of the electrical angle estimated according to the third method with an angular velocity calculated on the basis of the electrical angle estimated according to the second method.

19. The motor control device according to claim 1, wherein
in the first method, in a case where a difference between q-axis inductance and d-axis inductance is less than a predetermined threshold value, the difference between the q-axis inductance and the d-axis inductance is increased by performing at least one of an increase of the q-axis inductance and a decrease of the d-axis inductance.

* * * * *